United States Patent
Yoshida et al.

(10) Patent No.: US 11,174,405 B2
(45) Date of Patent: Nov. 16, 2021

(54) FINE WHITE PARTICLES COMPRISING POLYMER-ENCAPSULATED TITANIUM OXIDE

(71) Applicant: KAO CORPORATION, Tokyo (JP)

(72) Inventors: Tomohide Yoshida, Wakayama (JP); Yasufumi Ueda, Wakayama (JP)

(73) Assignee: KAO CORPORATION, Tokyo (JP)

( * ) Notice: Subject to any disclaimer, the term of this patent is extended or adjusted under 35 U.S.C. 154(b) by 186 days.

(21) Appl. No.: 16/463,515

(22) PCT Filed: Nov. 30, 2017

(86) PCT No.: PCT/JP2017/043177
§ 371 (c)(1),
(2) Date: May 23, 2019

(87) PCT Pub. No.: WO2018/101441
PCT Pub. Date: Jun. 7, 2018

(65) Prior Publication Data
US 2019/0315984 A1  Oct. 17, 2019

(30) Foreign Application Priority Data
Nov. 30, 2016  (JP) .............................. JP2016-233120

(51) Int. Cl.
B32B 5/16 (2006.01)
C09C 1/36 (2006.01)
C09D 11/322 (2014.01)
C09C 3/06 (2006.01)
C09C 3/10 (2006.01)

(52) U.S. Cl.
CPC .......... C09D 11/322 (2013.01); C09C 1/3607 (2013.01); C09C 3/06 (2013.01); C09C 3/10 (2013.01); C01P 2004/62 (2013.01); C01P 2004/64 (2013.01)

(58) Field of Classification Search
CPC .......................... C09C 1/3676; C09D 17/008
USPC ........................................................ 428/407
See application file for complete search history.

(56) References Cited

U.S. PATENT DOCUMENTS

| | | | |
|---|---|---|---|
| 5,431,956 A | 7/1995 | Robb et al. | |
| 5,534,585 A * | 7/1996 | Roulstone | C09D 17/001 524/497 |
| 8,987,350 B2 * | 3/2015 | Li | C09D 191/06 523/205 |
| 2004/0071956 A1 | 4/2004 | Tsuji et al. | |
| 2008/0314292 A1 * | 12/2008 | Shimanaka | C08F 220/28 106/505 |
| 2010/0120974 A1 | 5/2010 | Shimanaka et al. | |
| 2010/0298483 A1 | 11/2010 | Allen et al. | |
| 2014/0011943 A1 | 1/2014 | Bardman et al. | |
| 2014/0183406 A1 | 7/2014 | Ide et al. | |
| 2017/0317348 A1 | 11/2017 | Ide et al. | |
| 2019/0352434 A1 * | 11/2019 | Yoshida | C08K 5/37 |

FOREIGN PATENT DOCUMENTS

| | | |
|---|---|---|
| CN | 1488666 A | 4/2004 |
| CN | 101627066 A | 1/2010 |
| EP | 0392065 A1 | 10/1990 |
| EP | 2990445 A1 | 3/2016 |
| JP | 6-49109 A | 2/1934 |

(Continued)

OTHER PUBLICATIONS

Machine Translation JP 2005-120365A (Year: 2005).*
European Patent Office Communication and extended search report issued in the corresponding European Patent Application No. 17876993.1 dated Apr. 17, 2020.
International Search Report, issued in PCT/JP2017/043177, PCT/ISA/210, dated Jan. 16, 2018.

*Primary Examiner* — Hoa (Holly) Le
(74) *Attorney, Agent, or Firm* — Birch, Stewart, Kolasch & Birch, LLP

(57) ABSTRACT

The present invention relates to white fine particles from which a white ink that is capable of satisfying both of high hiding power and good bending resistance in a printed material can be obtained, and further relates to white fine particles from which an ink that is capable of satisfying not only excellent fixing properties even when printed on a non-liquid absorbing printing medium such as a resin film, but also suppression of increase in viscosity of the ink and at the same time good deinking properties at a high level can be obtained. The present invention provides [1] white fine particles containing titanium oxide and a polymer component with which the titanium oxide is encapsulated, in which a titanium atomic fraction of a surface of the respective white fine particles as measured at a photoelectron takeoff angle of 45° by X-ray photoelectron spectroscopy (XPS) is not more than 7 atomic %, [2] a water-based ink containing the aforementioned white fine particles, in which the titanium atomic fraction of the surface of the respective white fine particles as measured at a photoelectron takeoff angle of 45° by XPS is not more than 5 atomic %, and [3] a process for producing a dispersion of white fine particles, including step 1 of mixing titanium oxide and a polymer dispersant to obtain a titanium oxide dispersion and step 2 of adding a polymerizable monomer to the thus obtained titanium oxide dispersion to subject the polymerizable monomer to polymerization reaction, thereby obtaining the dispersion of the white fine particles, in which a titanium atomic fraction of a surface of the respective white fine particles as measured at a photoelectron takeoff angle of 45° by XPS is not more than 7 atomic %.

16 Claims, No Drawings

(56) References Cited

FOREIGN PATENT DOCUMENTS

| | | |
|---|---|---|
| JP | 2-274772 A | 11/1990 |
| JP | 2002-206028 A | 7/2002 |
| JP | 2004-124045 A | 4/2004 |
| JP | 2005-120365 A | 5/2005 |
| JP | 2005-342563 A | 12/2005 |
| JP | 2006-96930 A | 4/2006 |
| JP | 2009-24165 A | 2/2009 |
| JP | 2311-225867 A | 11/2011 |
| JP | 2012-236868 A | 12/2012 |
| JP | 2013-522389 A | 6/2013 |
| JP | 2013-203975 A | 10/2013 |
| JP | 2014-43492 A | 3/2014 |
| JP | 2014-515765 A | 7/2014 |
| JP | 2015-108063 A | 6/2015 |
| JP | 2016-44304 A | 4/2016 |
| JP | 2016-79385 A | 5/2016 |
| JP | 2016-155340 A1 | 9/2016 |
| WO | WO 2013/002163 A1 | 1/2013 |

* cited by examiner

FINE WHITE PARTICLES COMPRISING POLYMER-ENCAPSULATED TITANIUM OXIDE

FIELD OF THE INVENTION

The present invention relates to white fine particles, a water-based ink containing the white fine particles, and a process for producing a dispersion of the white fine particles.

BACKGROUND OF THE INVENTION

In ink-jet printing methods, droplets of ink are directly projected onto a printing medium from very fine nozzles and allowed to adhere to the printing medium to obtain printed materials on which characters or images are printed. The ink-jet printing methods need no printing plate unlike the conventional printing methods. Therefore, it has been expected that the ink-jet printing methods can be used in extensive applications as on-demand printing methods that are adaptable for production of a small number and various kinds of prints. In particular, in recent years, there is an increasing demand for not only printed materials using a conventional printing paper having a white ground, but also printed materials using a printing medium having a non-white ground, such as a corrugated board, a paper board, a resin film, etc.

When producing printed materials using the printing medium having a non-white ground, a white ink is used for the purpose of expressing a white color or enhancing visibility of images. As a pigment for the white ink, titanium oxide that is an inorganic pigment having high hiding power has been generally used. In addition, for the purpose of improving dispersibility of the titanium oxide in the ink, a polymer dispersant has been used therein.

JP 2009-24165A (Patent Literature 1) discloses a polymer dispersant that is constituted of an aromatic and/or heterocyclic vinyl monomer unit, an acid group-containing monomer unit, a (meth)acrylic acid ester monomer unit and a monomer unit containing a polyalkylene glycol chain having a specific molecular weight or a chain of a monoalkyl ether of the polyalkylene glycol, and has a specific acid value and a specific molecular weight. In Examples of the Patent Literature 1, it is described that titanium oxide, etc., is used as a pigment, and a pigment dispersion using the polymer dispersant can be used as a colorant for an aqueous coating material, an aqueous gravure ink, an aqueous ink-jet ink, etc.

JP 2006-96930A (Patent Literature 2) relates to a pigment ink composition that can be used for producing a printed material that is excellent in dispersibility of pigment particles, color developability, rub fastness, etc., and discloses such an ink composition that contains encapsulated titanium oxide colloid particles and encapsulated pigment particles which both are coated with a polymer material. In the Patent Literature 2, it is described that the titanium oxide colloid particles contained in the ink composition are produced by mixing a titanium oxide colloid having a positive charge on a surface thereof and at least one anionic polymerizable surfactant to prepare an aqueous mixture, and further adding at least one polymerizable monomer as well as at least one anionic or cationic polymerizable surfactant to the aqueous mixture, followed by subjecting the resulting mixture to polymerization.

JP 2012-236868A (Patent Literature 3) discloses a water dispersion of a resin-coated titanium oxide which is excellent in storage stability and hiding power and can be suitably used in an ink-jet ink, and which is produced by subjecting a surface of titanium oxide to hydrophobic treatment, coating the thus treated titanium oxide with a resin to obtain a resin-coated titanium oxide having a resin coating rate of 100% by mass or more, and dispersing the resulting resin-coated titanium oxide in water. In the Patent Literature 3, there is also described a process for producing the water dispersion of the resin-coated titanium oxide in which anatase-type titanium oxide whose surface is subjected to hydrophobic treatment (Examples) is dispersed in an oil phase containing a monomer and/or an oligomer, and the oil phase is emulsified in a water phase to prepare an emulsion of an oil-in-water (O/W) type, followed by subjecting the resulting emulsion to mini-emulsion polymerization.

JP 2005-120365A (Patent Literature 4) discloses a process for producing polymer-coated particles which includes the step of subjecting a dispersion in which core particles and a monomer component are dispersed and allowed to coexist together in a hydrophilic solvent, to radical polymerization to coat a surface of the respective core particles with a polymer layer, in which the core particles are prepared by previously mixing raw core particles with a coupling agent containing a polymerizable reactive group, and the monomer component is constituted of a hydrophilic monomer and a hydrophobic monomer. In Examples of the Patent Literature 4, there were used rutile-type titanium oxide particles ("TIPAQUE CR-90") whose surface was treated with Al and Si.

SUMMARY OF THE INVENTION

The present invention relates to the following aspects [1] to [4].

[1] White fine particles containing titanium oxide and a polymer component with which the titanium oxide is encapsulated, in which a titanium atomic fraction of a surface of the respective white fine particles as measured at a photoelectron takeoff angle of 45° by X-ray photoelectron spectroscopy (XPS) is not more than 7 atomic %.

[2] White fine particles containing titanium oxide and a polymer component with which the titanium oxide is encapsulated, in which a titanium atomic fraction of a surface of the titanium oxide as measured at a photoelectron takeoff angle of 20° by XPS is not less than 30 atomic %, and a titanium atomic fraction of a surface of the respective white fine particles as measured at a photoelectron takeoff angle of 20° by XPS is not more than 2 atomic %.

[3] A water-based ink containing the white fine particles according to the aforementioned aspect [1] or [2], in which the titanium atomic fraction of the surface of the respective white fine particles as measured at a photoelectron takeoff angle of 45° by X-ray photoelectron spectroscopy (XPS) is not more than 5 atomic %.

[4] A process for producing a dispersion of white fine particles formed by encapsulating titanium oxide with a polymer component, including the following steps 1 and 2:

Step 1: mixing the titanium oxide and a polymer dispersant to obtain a titanium oxide dispersion; and Step 2: adding a polymerizable monomer to the titanium oxide dispersion obtained in the step 1 to subject the polymerizable monomer to polymerization reaction, thereby obtaining the dispersion of the white fine particles, in which a titanium atomic fraction of a surface of the respective white fine particles as measured at a photoelectron takeoff angle of 45° by X-ray photoelectron spectroscopy (XPS) is not more than 7 atomic %, and the titanium oxide is untreated, or surface-treated with at least one material selected from the group consisting of alumina, silica, zinc oxide and zirconia.

DETAILED DESCRIPTION OF THE INVENTION

White inks have been frequently used as a base ink in film printing, etc., to print a background for characters or images upon forming printed materials such as printed matters, etc., and therefore required to have high hiding power. In order to increase the hiding power of the white inks, it is necessary to enhance a concentration of a white pigment used therein such as titanium oxide. However, if the concentration of the titanium oxide in the white inks is simply enhanced, there tends to arise such an inconvenience that the inks suffer from increase in viscosity thereof. In addition, the printed materials using a printing medium such as a packaging material and a resin film material are required to have good bending resistance. If the thickness of a pigment layer in the printed materials is increased, the printed materials tend to be deteriorated in bending resistance.

The white inks using the conventional titanium oxides tend to suffer from large increase in their viscosity by addition of the titanium oxide thereto, because of poor dispersibility of the titanium oxide in the inks. In order to suppress the increase in viscosity of the inks, the amount of a polymer dispersant added thereto is restricted. As a result, it is considered that the inks tend to be insufficient in hiding power, and the resulting printed materials tend to be insufficient in strength of a surface film formed thereon. In the technologies described in the Patent Literature 2 using the encapsulated titanium oxide colloid particles, the resulting inks also tend to be insufficient in hiding power.

The technologies described in the Patent Literatures 3 and 4 are useful to some extent in the fields of pigments, etc. However, in the Patent Literatures 3 and 4, merely the polymer-coated particles having a low titanium oxide encapsulation rate are obtained, and further there also occurs such a matter that the particles are deteriorated in coating properties, and therefore a large amount of particles formed of the polymer solely are included in the resulting inks.

Also, in recent years, there is an increasing demand for on-demand printing on a non-liquid absorbing printing medium such as a resin film, and the problems tend to be posed by poor fixing properties of the inks on the non-liquid absorbing printing medium. In general, the inks are improved in fixing properties by adding a polymer dispersant thereto. However, the inks tend to suffer from increase in viscosity thereof by addition of the polymer dispersant thereto, and therefore tend to be deteriorated in ejection properties when used in ink-jet printing apparatuses, etc.

On the other hand, the white inks containing the titanium oxide have been used to print a background for images or characters on a printing medium such as a transparent film, and solid image printing has been frequently conducted using a large amount of the white inks. In the case where the inks have high fixing properties on the non-liquid absorbing printing medium, since the titanium oxide is not easily separated from the printing medium, so that it tends to be difficult to recycle waste printed materials to obtain a reclaimed printing medium. For this reason, from the standpoint of improving recyclability of the waste printed materials into the reclaimed printing medium, it has been demanded to provide inks having low fixing properties, i.e., excellent deinking properties.

The present invention relates to white fine particles from which a white ink that is capable of satisfying both of high hiding power and good bending resistance in a printed material can be obtained (first subject), and further relates to white fine particles from which an ink that is capable of satisfying not only excellent fixing properties even when printed on a non-liquid absorbing printing medium such as a resin film, but also suppression of increase in viscosity of the ink and at the same time good deinking properties at a high level can be obtained (second subject), and furthermore relates to a water-based ink containing the white fine particles as well as a process for producing a dispersion of the white fine particles.

The present inventors have found that in the white fine particles formed by encapsulating titanium oxide with a polymer component, when the extent of encapsulating the titanium oxide with the polymer component is controlled to a specific value or less in terms of a titanium atomic fraction of a surface of the respective white fine particles as measured by X-ray photoelectron spectroscopy (XPS) as one of surface analyzing methods, a water-based white ink containing the white fine particles is capable of satisfying both of high hiding power and good bending resistance in the resulting printed material.

In addition, the present inventors have found that when the titanium atomic fraction of the surface of the titanium oxide as the raw material and the titanium atomic fraction of the surface of the respective white fine particles are controlled to a specific value or more and a specific value or less, respectively, the resulting water-based white ink containing the white fine particles is capable of satisfying not only excellent fixing properties even when printed on a non-liquid absorbing printing medium, but also suppression of increase in viscosity of the ink and at the same time good deinking properties at a high level.

That is, the present invention relates to the following aspects [1] to [4].

[1] White fine particles containing titanium oxide and a polymer component with which the titanium oxide is encapsulated, in which a titanium atomic fraction of a surface of the respective white fine particles as measured at a photoelectron takeoff angle of 45° by X-ray photoelectron spectroscopy (XPS) is not more than 7 atomic % (first embodiment).

[2] White fine particles containing titanium oxide and a polymer component with which the titanium oxide is encapsulated, in which a titanium atomic fraction of a surface of respective particles of the titanium oxide as measured at a photoelectron takeoff angle of 20° by XPS is not less than 30 atomic %, and a titanium atomic fraction of a surface of the respective white fine particles as measured at a photoelectron takeoff angle of 20° by XPS is not more than 2 atomic % (second embodiment).

[3] A water-based ink containing the white fine particles according to the aforementioned aspect [1] or [2], in which the titanium atomic fraction of the surface of the respective white fine particles as measured at a photoelectron takeoff angle of 45° by XPS is not more than 5 atomic %.

[4] A process for producing a dispersion of white fine particles formed by encapsulating titanium oxide with a polymer component, including the following steps 1 and 2:

Step 1: mixing the titanium oxide and a polymer dispersant to obtain a titanium oxide dispersion; and Step 2: adding a polymerizable monomer to the titanium oxide dispersion obtained in the step 1 to subject the polymerizable monomer to polymerization reaction, thereby obtaining the dispersion of the white fine particles, in which a titanium atomic fraction of a surface of the respective white fine particles as measured at a photoelectron takeoff angle of 45° by XPS is not more than 7 atomic %, and the titanium oxide is untreated, or surface-treated with at least one material selected from the group consisting of alumina, silica, zinc oxide and zirconia.

In accordance with the present invention, it is possible to provide white fine particles from which a white ink that is capable of satisfying both of high hiding power and good bending resistance in a printed material can be obtained (first embodiment); white fine particles from which an ink that is capable of satisfying not only excellent fixing properties even when printed on a non-liquid absorbing printing medium such as a resin film, but also suppression of increase in viscosity of the ink and at the same time good deinking properties at a high level can be obtained (second embodiment); a water-based ink, preferably a water-based ink for ink-jet printing, containing the white fine particles; and a process for producing a dispersion of the white fine particles.

Meanwhile, the term "water-based" as used in the present specification means that water has a largest content among components of a dispersing medium contained in the ink.

In addition, the term "printing" as used in the present specification means a concept that includes printing or typing for printing characters or images, and the term "printed material" as used in the present specification means a concept that includes printed matters or typed materials on which characters or images are printed.

Overview of First Embodiment

The white fine particles of the first embodiment are in the form of white fine particles formed by encapsulating titanium oxide with a polymer component in which a titanium atomic fraction of a surface of the respective white fine particles as measured at a photoelectron takeoff angle of 45° by XPS is not more than 7 atomic %.

When incorporating the white fine particles of the first embodiment into a water-based ink and printing characters or images on a printing medium using the water-based ink, the resulting printed material is capable of satisfying both of high hiding power and good bending resistance. The reason why the aforementioned advantageous effects can be attained by the present invention is considered as follows though it is not clearly determined yet.

That is, in the white fine particles of the first embodiment, the titanium atomic fraction of the surface of the respective white fine particles as measured at a photoelectron takeoff angle of 45° by XPS is not more than 7 atomic %. Thus, since a predetermined area or more of the surface of the titanium oxide is covered with the polymer component, the titanium oxide particles can be prevented from suffering from flocculation thereof and can be improved in dispersibility. As a result, it is considered that when the white fine particles are incorporated into a water-based ink and printing characters or images on a printing medium using the water-based ink, it is possible to uniformly distribute the titanium oxide in the form of a thin layer on the surface of the resulting printed material to thereby improve hiding power thereof.

In addition, it is considered that since the titanium oxide is thus improved in dispersibility, the resulting water-based ink can be prevented from suffering from increase in viscosity thereof owing to addition of the titanium oxide thereto, and the resulting printed material is free from unevenness or mottling of printed characters or images and can be improved in bending resistance even when adding a larger amount of the titanium oxide than that added conventionally into the water-based ink, so that it is possible to satisfy both of high hiding power and good bending resistance in the printed material.

Overview of Second Embodiment

The white fine particles of the second embodiment are included in the concept of the white fine particles of the first embodiment, and contain titanium oxide and a polymer component with which the titanium oxide is encapsulated, in which a titanium atomic fraction of a surface of respective particles of the titanium oxide as measured at a photoelectron takeoff angle of 20° by XPS is not less than 30 atomic %, and a titanium atomic fraction of a surface of the respective white fine particles as measured at a photoelectron takeoff angle of 20° by XPS is not more than 2 atomic %.

In the white fine particles of the second embodiment, the titanium oxide having a titanium atomic fraction of not less than 30 atomic % as measured on a surface of respective particles of the titanium oxide, i.e., the titanium oxide whose surface is substantially untreated with an inorganic material, etc., is used as a raw material thereof. For this reason, it is considered that the titanium oxide exhibits photocatalytic activity, and it is therefore possible to efficiently decompose the titanium oxide contained in the printed characters or images by irradiating ultraviolet rays to the resulting printed material, thereby facilitating removal of the ink, i.e., deinking, from the printed material.

In addition, in the white fine particles of the second embodiment, the titanium atomic fraction of the surface of the respective white fine particles as measured at a photoelectron takeoff angle of 20° by XPS is not more than 2 atomic %. Thus, since substantially the whole area of the surface of the titanium oxide is covered with a thin film of the polymer component, the titanium oxide particles can be prevented from suffering from flocculation thereof and can be improved in dispersibility. For this reason, it is considered that the polymer component can be added in a larger amount than that added conventionally to the water-based ink while preventing the ink from suffering from increase in viscosity, and it is therefore possible to improve fixing properties of the ink onto a printing medium while maintaining good ejection properties thereof when used in an ink-jet printing apparatus, etc.

(Overview of Process for Producing Dispersion of White Fine Particles)

In the process for producing the dispersion of the white fine particles according to the present invention, the titanium oxide and the polymer dispersant are first mixed with each other to obtain a titanium oxide dispersion, and then while further adding a polymerizable monomer to the thus obtained titanium oxide dispersion, the polymerizable monomer is subjected to (seed) polymerization. In the aforementioned process, the titanium oxide particles are first deflocculated using the polymer dispersant to obtain the titanium oxide dispersion having improved dispersibility, and then the polymerizable monomer is subjected to seed polymerization therein, whereby the polymerization of the polymerizable monomer is allowed to proceed by the polymer dispersant acting as a foundation which is present on the surface of the titanium oxide dispersion so as to encapsulate the titanium oxide with the polymer component. Therefore, it is considered that the degree of exposure of a titanium atom onto the surface of the respective particles is very small, so that it is possible to obtain the dispersion of the white fine particles which is excellent in dispersibility.

As the polymer component that serves for encapsulating the titanium oxide therewith, preferred is a polymer containing a constitutional unit derived from a (meth)acrylic monomer, and more preferred is a polymer containing a constitutional unit derived from at least one polymerizable monomer selected from the group consisting of a (meth) acrylate and an aromatic group-containing monomer, etc., in addition to the underlying polymer dispersant containing a constitutional unit derived from at least one monomer selected from the group consisting of (meth)acrylic acid and an alkyl (meth)acrylate, etc., as described herein under.

The resulting white fine particles are preferably in the form of particles on a surface of which substantially no titanium oxide is exposed. The polymer component is not particularly limited as long as the titanium oxide can be covered or encapsulated therewith, and is preferably constituted of a mixture containing the below-mentioned polymer dispersant and the polymer obtained from the polymerizable monomer.

In the following, the white fine particles according to the first and second embodiments, the process for producing the dispersion of the white fine particles, and a water-based ink are successively described in more detail.

[White Fine Particles of First Embodiment]
<Titanium Oxide>

The white fine particles and the water-based ink (hereinafter also referred to merely as an "ink") according to the first embodiment of the present invention contain titanium oxide.

Examples of a crystal structure of the titanium oxide include a rutile type (tetragonal system) structure, an anatase type (tetragonal system) structure and a brookite type (orthorhombic system) structure. Among the titanium oxides having these crystal structures, from the viewpoint of attaining good stability, hiding power and availability of crystals of the titanium oxide, the rutile-type titanium oxide (hereinafter also referred to merely as "titanium oxide") is preferably used in the present invention.

The titanium oxide used in the present invention may be produced by either a gas phase method or a liquid phase method. From the viewpoint of facilitating production of the titanium oxide having high crystallinity, the titanium oxide produced by a gas phase method is more preferably used.

The titanium oxide may be in the form of an untreated titanium oxide. However, the titanium oxide is preferably in the form of a surface-treated titanium oxide from the viewpoint of attaining good dispersibility of the titanium oxide. Examples of the surface treatment of the titanium oxide include a surface treatment with an inorganic material, a surface treatment with an organic material such as a titanium coupling agent, a silane coupling agent and a silicone oil, and the like. Among these surface treatments, the surface treatment with an inorganic material is preferred.

As the method for surface-treating the titanium oxide with the inorganic material, there may be mentioned a method for surface-treating the titanium oxide with at least one inorganic material selected from the group consisting of alumina ($Al_2O_3$), silica ($SiO_2$), zinc oxide (ZnO), zirconia ($ZrO_2$), magnesium oxide (MgO) and the like.

From the viewpoint of improving dispersibility and hiding power of the white fine particles as well as from the viewpoint of obtaining a white ink that is capable of satisfying not only excellent fixing properties on a printing material, but also suppression of increase in viscosity of the ink and good deinking properties at a high level, the titanium oxide is preferably either untreated or surface-treated with at least one inorganic material selected from the group consisting of alumina, silica, zinc oxide and zirconia, and more preferably either untreated or surface-treated with at least one inorganic material selected from the group consisting of alumina, silica and zinc oxide.

The titanium oxide particles thus surface-treated are calcined at a temperature of from 800 to 1000° C., so that it is possible to suppress sintering between the titanium oxide particles and thereby improve flowability and dispersibility of the titanium oxide particles having a secondary particle size.

The particle shape of the titanium oxide is not particularly limited, and may be a granular shape, an acicular shape, etc. The average primary particle size of the titanium oxide is not less than 30 nm and not more than 500 nm in terms of an arithmetic mean of major axis diameters of primary particles of the titanium oxide.

The average primary particle size of the titanium oxide is more preferably not less than 40 nm, even more preferably not less than 100 nm, further even more preferably not less than 150 nm and still further even more preferably not less than 200 nm in terms of an arithmetic mean of major axis diameters of the primary particles from the viewpoint of improving whiteness of the resulting white fine particles, and is also more preferably not more than 450 nm, even more preferably not more than 400 nm and further even more preferably not more than 350 nm in terms of an arithmetic mean of major axis diameters of the primary particles from the viewpoint of improving hiding power of the resulting white fine particles.

Meanwhile, the average primary particle size of the titanium oxide may be measured in terms of an arithmetic mean of major axis diameters of the primary particles, and more specifically measured by the method described in Examples below.

Examples of commercially available products of the rutile-type titanium dioxide include "TIPAQUE R" (tradename) series products, "TIPAQUE CR" (tradename) series products and "TIPAQUE PF" (tradename) series products all available from Ishihara Sangyo Kaisha, Ltd.; "R" (tradename) series products available from Sakai Chemical Industry Co., Ltd.; "JR" (tradename) series products and "MT" (tradename) series products both available from TAYCA Corporation; "KURONOS KR" (tradename) series products available from Titan Kogyo Co., Ltd.; and "TR" (tradename) series products available from Huntsmann Corporation.

(Titanium Atomic Fraction of Surface of Respective White Fine Particles as Measured by XPS)

The titanium atomic fraction of the surface of the respective white fine particles of the first embodiment as measured at a photoelectron takeoff angle of 45° by X-ray photoelectron spectroscopy (XPS) is not more than 7 atomic % from the viewpoint of obtaining a white ink that is capable of satisfying both of high hiding power and good bending resistance in the resulting printed material.

XPS is an analyzing method in which characteristic X rays are irradiated to a surface of a solid sample (white fine particles) to detect photoelectrons emitted from the solid sample by photoelectric effect. According to XPS, it is possible to analyze kinds of elements, core level and conditions of chemical bonds in the solid sample from kinematic energy of the photoelectrons detected.

In XPS, the measuring depth may be adjusted by varying a detection angle θ (photoelectron takeoff angle). When reducing the detection angle, it is possible to attain information about a shallower depth of an object to be measured. For example, since the thickness of a surface-treated inorganic material film of the titanium oxide is in the order of several nanometers, the XPS measurement is preferably conducted at a detection angle as shallow as 20° in order to clearly determine the surface-treated condition of the titanium oxide as the raw material. On the other hand, in the case where it should be determined whether or not a polymer film having a thickness of several tens of nanometers is formed in the white fine particles to suitably coat the titanium oxide with the polymer film, the XPS measurement may be conducted at a larger detection angle such as 45° to attain information about a larger depth range (several tens of nanometers) from the surface of the respective white fine particles.

The titanium atomic fraction of the surface of the respective white fine particles of the first embodiment as measured at a photoelectron takeoff angle of 45° by XPS is preferably not more than 6 atomic %, more preferably not more than 5 atomic %, even more preferably not more than 4 atomic %, further even more preferably not more than 3 atomic %, still further even more preferably not more than 2 atomic % and furthermore preferably 0 atomic % from the viewpoint of obtaining a white ink that is capable of further satisfying high hiding power and good bending resistance in the resulting printed material.

The titanium atomic fraction by XPS may be measured by the method described in Examples below.

[White Fine Particles of Second Embodiment]

The white fine particles and the water-based ink according to the second embodiment of the present invention contain titanium oxide.

The crystal structure, particle shape and average primary particle size of the titanium oxide used in the white fine particles of the second embodiment are the same as those used in the white fine particles of the first embodiment. The rutile-type titanium oxide is preferably used in the white fine particles of the second embodiment.

In general, as the titanium oxide, there may be frequently used those titanium oxides that are surface-treated with an inorganic material or an organic material. In the second embodiment of the present invention, from the viewpoint of allowing the titanium oxide to exhibit good photoelectric activity to thereby improve deinking properties of the resulting ink, the titanium oxide that is subjected to no surface treatment (i.e., untreated titanium oxide) is preferably used. However, the surface-treated titanium oxide may also be used in the form of a mixture with the untreated titanium oxide as long as the titanium atomic fraction of the surface of respective particles of the titanium oxide as measured at a photoelectron takeoff angle of 20° by XPS falls in the range of not less than 30 atomic %.

Examples of commercially available products of the untreated rutile-type titanium oxide include "JR" (tradename) series products and "MT" (tradename) series products both available from TAYCA Corporation; "KURONOS KR" (tradename) series products available from Titan Kogyo Co., Ltd.; and the like.

(Titanium Atomic Fraction of Surface of Respective Particles of Raw Material Titanium Oxide as Measured by XPS)

The maximum value of the titanium atomic fraction of the surface of respective particles of the raw material titanium oxide used in the second embodiment as measured at a photoelectron takeoff angle of 20° by XPS is 33.3 atomic % in view of an atomic composition thereof ($TiO_2$). The titanium atomic fraction of the surface of respective particles of the raw material titanium oxide is reduced by subjecting the titanium oxide to surface treatments or coating treatment, etc., and in the case where no titanium atom is present on the surface of the respective particles, the titanium atomic fraction is reduced to 0 atomic %.

The titanium atomic fraction of the surface of the respective particles of the raw material titanium oxide as measured at a photoelectron takeoff angle of 20° by XPS is not less than 30 atomic %, preferably not less than 31 atomic %, more preferably not less than 32 atomic % and even more preferably not less than 33 atomic % from the viewpoint of obtaining an ink containing the white fine particles which is capable of satisfying not only excellent fixing properties on a printing medium, but also suppression of increase in viscosity of the ink and good deinking properties.

(Titanium Atomic Fraction of Surface of Respective White Fine Particles as Measured by XPS)

The white fine particles of the second embodiment are in the form of white fine particles formed by encapsulating the titanium oxide with the polymer component, in which the titanium atomic fraction of the surface of respective particles of the raw material titanium oxide as measured at a photoelectron takeoff angle of 20° by XPS is not less than 30 atomic %, and the titanium atomic fraction of the surface of the respective white fine particles as measured at a photoelectron takeoff angle of 20° by XPS is not more than 2 atomic %. In such white fine particles, the raw material titanium oxide is subjected to substantially no surface treatment with an inorganic material, etc., and the whole surface of the titanium oxide in the white fine particles is coated with a thin film of the polymer component.

The titanium atomic fraction of the surface of the respective white fine particles as measured at a photoelectron takeoff angle of 20° by XPS is preferably not more than 2 atomic %, more preferably not more than 1.9 atomic %, even more preferably not more than 1.7 atomic %, further even more preferably not more than 1.5 atomic %, still further even more preferably not more than 1.2 atomic %, furthermore preferably not more than 1.0 atomic %, even furthermore preferably not more than 0.8 atomic % and most preferably 0 atomic % from the viewpoint of obtaining a white ink that is capable of satisfying not only excellent fixing properties on a printing medium, but also suppression of increase in viscosity of the ink and good deinking properties at a high level.

In the present invention, the white fine particles whose titanium atomic fraction as measured on the surface of the respective white fine particles at a photoelectron takeoff angle of 20° by XPS is not more than 2 atomic % may also be used in combination with a small amount of the white fine particles whose titanium atomic fraction as measured on the surface of the respective white fine particles at a photoelectron takeoff angle of 20° by XPS is more than 2 atomic %. However, even in such a case, it is preferred that the titanium atomic fraction of the surface of the respective white fine particles as a whole falls within the range of not more than 2 atomic %.

As the scale for expressing the degree of coating of the raw material titanium oxide with the polymer component, there may be mentioned a polymer coating rate represented by the following formula (1). When the polymer coating rate represented by the formula (1) is 100%, it is indicated that the raw material titanium oxide is completely coated with the polymer component, and when the polymer coating rate represented by the formula (1) is 0%, it is indicated that the raw material titanium oxide is not coated at all, i.e., uncoated with the polymer component.

Polymer coating rate (%)={1−(titanium atomic fraction of surface of respective white fine particles)/(titanium atomic fraction of surface of titanium oxide)}×100     (1)

In the white fine particles of the second embodiment, the polymer coating rate represented by the formula (1) is preferably not less than 93%, more preferably not less than 95%, even more preferably not less than 97% and further even more preferably not less than 99%, and is also not more than 100%.

[Process for Producing Dispersion of White Fine Particles]

The white fine particles of the present invention can be efficiently produced by the production process including the following steps 1 and 2 as a dispersion of the white fine particles.

Step 1: mixing the titanium oxide and a polymer dispersant to obtain a titanium oxide dispersion; and Step 2: adding a polymerizable monomer to the titanium oxide dispersion obtained in the step 1 to obtain a dispersion of the white fine particles.

<Step 1>

In the step 1, the titanium oxide and the polymer dispersant are mixed with each other to obtain the titanium oxide dispersion.

The details of the titanium oxide are the same as described previously, i.e., the titanium oxide is untreated, or surface-treated with at least one material selected from the group consisting of alumina, silica, zinc oxide and zirconia.

(Polymer Dispersant)

The polymer dispersant is preferably in the form of a water-insoluble polymer from the viewpoint of adsorbing the polymer dispersant onto the surface of the titanium oxide in the step 1 and uniformly dispersing the titanium oxide when adding the polymerizable monomer to the titanium oxide dispersion to polymerize the polymerizable monomer in the step 2.

Whether or not the polymer is "water-insoluble" can be determined as follows. That is, the "water-insoluble" properties of the polymer can be determined by satisfying either the case where Tyndall phenomenon is recognized in a water dispersion of the non-neutralized or neutralized water-insoluble polymer when being observed under irradiation with laser light or ordinary light, or the case where an average particle size of the water-insoluble polymer particles can be measured under the following measuring conditions.

Measuring Conditions:

The cumulant analysis of the water dispersion of the water-insoluble polymer is conducted using a laser particle analyzing system "ELSZ-1000" available from Otsuka Electrics Co., Ltd., under the conditions including a temperature of 25° C., an angle between incident light and detector of 165° and a cumulative number of 32 times, in which a refractive index of water (1.333) is input into the analyzing system as a refractive index of the dispersing medium, and the dispersion to be measured is diluted with water so as to adjust a concentration of the dispersion to 0.18% by mass in terms of a solid content thereof.

The polymer dispersant contains a salt-forming group, and it is preferred that the salt-forming group is at least partially neutralized with a basic compound. The polymer is preferably kept water-insoluble not only surely in a non-neutralized condition, but also even after neutralizing a part of the salt-forming group.

Examples of the water-insoluble polymer used in the present invention include vinyl-based polymers, polyesters, polyurethanes and the like. In addition, as the water-insoluble polymer, there may also be used commercially available dispersions of water-insoluble polymer particles.

Examples of the commercially available dispersions of water-insoluble polymer particles include dispersions of particles constituted of acrylic resins, urethane resins, styrene-butadiene resins, styrene-acrylic resins and vinyl chloride-based resins. Specific examples of the commercially available dispersions of water-insoluble polymer particles include dispersions of acrylic resins such as "Neocryl A1127" (anionic self-crosslinkable aqueous acrylic resin) available from DSM NeoResins, Inc., and "JONCRYL 390" available from BASF Japan, Ltd.; dispersions of urethane resins such as "WBR-2018" and "WBR-2000U" both available from Taisei Fine Chemical Co., Ltd.; dispersions of styrene-butadiene resins such as "SR-100" and "SR102" both available from Nippon A & L Inc.; dispersions of styrene-acrylic resins such as "JONCRYL 7100", "JONCRYL 734" and "JONCRYL 538" all available from BASF Japan, Ltd.; and dispersions of vinyl chloride-based resins such as "VINYBLAN 701" available from Nissin Chemical Co., Ltd., etc.

As the water-insoluble polymer, from the viewpoint of efficiently dispersing the titanium oxide with the polymer, preferred is a vinyl polymer that is produced by addition-polymerizing a vinyl monomer (such as a vinyl compound, a vinylidene compound and a vinylene compound), and more preferred is a vinyl polymer that is produced by copolymerizing a monomer mixture containing (a) a salt-forming group-containing monomer (hereinafter also referred to merely as a "component (a)") and (b) a hydrophobic monomer (hereinafter also referred to merely as a "component (b)") (such a mixture is hereinafter also referred to merely as a "monomer mixture").

The water-insoluble polymer contains a constitutional unit derived from the component (a) and a constitutional unit derived from the component (b). In addition, the water-insoluble polymer may further contain at least one constitutional unit selected from the group consisting of a constitutional unit derived from a macromonomer and a constitutional unit derived from a nonionic monomer.

The polymer dispersant constituted of the aforementioned vinyl monomer not only can be easily adsorbed onto the titanium oxide, but also is water-insoluble. Therefore, it is considered that the polymer dispersant is capable of uniformly dispersing the titanium oxide in an aqueous medium.

[(a) Salt-Forming Group-Containing Monomer]

The salt-forming group-containing monomer (a) is used from the viewpoints of enhancing dispersibility of the resulting polymer. By enhancing the dispersibility of the polymer, it is possible to improve dispersibility of the resulting white fine particles, so that the resulting water-based ink can be improved in storage stability.

Examples of the salt-forming group-containing monomer (a) include a cationic monomer and an anionic monomer. Among these monomers, preferred is an anionic monomer. When using the cationic monomer as the salt-forming group-containing monomer (a), the cationic monomer is preferably used in combination with the anionic monomer. In this case, the cationic monomer is more preferably used such that the resulting polymer dispersant becomes anionic as a whole.

Examples of the salt-forming group include an anionic group such as a carboxy group, a sulfonic group and a phosphoric group, an amino group, an ammonium group and the like. Among these salt-forming groups, preferred is a carboxy group.

Typical examples of the cationic monomer include amino group-containing monomers and ammonium group-containing monomers. Among these cationic monomers, preferred are NNdimethylaminoethyl (meth)acrylate, N-(N',N'-dimethylaminopropyl) (meth)acrylamide and vinyl pyrrolidone.

Typical examples of the anionic monomer include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid, 3-sulfopropyl (meth)acrylate and bis(3-sulfopropyl) itaconate.

Specific examples of the phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among the above anionic monomers, from the viewpoints of improving dispersibility of the titanium oxide with the polymer dispersant, preferred are the carboxylic acid monomers, more preferred are acrylic acid and methacrylic acid, and even more preferred is acrylic acid.

[(b) Hydrophobic Monomer]

The hydrophobic monomer (b) is used from the viewpoint of enhancing affinity of the polymer dispersant to the titanium oxide as well as from the viewpoint of improving hiding power of the resulting ink. Suitable examples of the hydrophobic monomer include alkyl (meth)acrylates and aromatic group-containing monomers. Among these hydrophobic monomers, from the viewpoints of enhancing affinity of the polymer dispersant to the titanium oxide as well as from the viewpoints of improving dispersibility and stability of the resulting white fine particles, more preferred are alkyl (meth)acrylates.

As the alkyl (meth)acrylates, there may be suitably used those alkyl (meth)acrylates containing an alkyl group preferably having 1 to 22 carbon atoms, more preferably 2 to 20 carbon atoms and even more preferably 3 to 18 carbon atoms. Examples of the alkyl (meth)acrylates include methyl (meth)acrylate, ethyl (meth)acrylate, (iso)propyl (meth) acrylate, (iso- or tertiary-)butyl (meth) acrylate, (iso)amyl (meth) acrylate, (iso)hexyl (meth) acrylate, cyclohexyl (meth) acrylate, 2-ethylhexyl (meth) acrylate, (iso)octyl (meth) acrylate, (iso)decyl (meth) acrylate, (iso)dodecyl (meth)acrylate and (iso)stearyl (meth)acrylate.

Meanwhile, in the present specification, the terms "(iso- or tertiary)" and "(iso)" as used herein mean both the structure in which any of the groups expressed by "iso- or tertiary-" and "iso" respectively are present, and the structure in which these groups are not present (i.e., normal). In addition, the term "(meth)acrylate" as used herein means an acrylate and/or a methacrylate.

Examples of the aromatic group-containing monomers include styrene-based monomers and aromatic group-containing (meth)acrylates. Specific examples of the preferred styrene-based monomers include styrene and 2-methyl styrene. Specific examples of the preferred aromatic group-containing (meth)acrylates include benzyl (meth)acrylate and phenoxyethyl (meth)acrylate.

Among these compounds as the component (b), preferred are alkyl (meth)acrylates containing an alkyl group having not less than 3 and not more than 10 carbon atoms, and more preferred are alkyl (meth)acrylates containing an alkyl group having not less than 3 and not more than 6 carbon atoms.

In the case where the polymer dispersant contains the constitutional units derived from the components (a) and (b), from the viewpoint of improving storage stability and hiding power of the resulting ink, the content of the constitutional unit derived from the component (a) in the whole constitutional units of the polymer dispersant is preferably not less than 30% by mass, more preferably not less than 40% by mass, even more preferably not less than 50% by mass and further even more preferably not less than 55% by mass, and is also preferably not more than 85% by mass, more preferably not more than 80% by mass and even more preferably not more than 75% by mass.

Also, the content of the constitutional unit derived from the component (b) in the whole constitutional units of the polymer dispersant is preferably not less than 15% by mass, more preferably not less than 20% by mass and even more preferably not less than 25% by mass, and is also preferably not more than 70% by mass, more preferably not more than 60% by mass, even more preferably not more than 50% by mass and further even more preferably not more than 45% by mass.

In addition, the total content of the constitutional units derived from the components (a) and (b) in the whole constitutional units of the polymer dispersant is preferably not less than 90% by mass, more preferably not less than 95% by mass and even more preferably not less than 99% by mass, and is also not more than 100% by mass, and preferably 100% by mass.

As described hereinbefore, the polymer dispersant is preferably in the form of the water-insoluble polymer containing the constitutional unit derived from the (meth)acrylic monomer, more specifically, the polymer containing the constitutional unit derived from (meth)acrylic acid as the constitutional unit derived from the component (a) as well as the constitutional unit derived from the alkyl (meth)acrylate as the constitutional unit derived from the component (b).

The number-average molecular weight of the polymer dispersant is preferably not less than 1,000 and not more than 70,000 from the viewpoint of improving dispersibility of the titanium oxide, etc.

From the viewpoint of satisfying both of excellent dispersibility of the titanium oxide and excellent storage stability of the resulting water-based ink as well as from the viewpoint of improving hiding power of the ink, the number-average molecular weight of the polymer dispersant is preferably not less than 1,000, more preferably not less than 1,200, even more preferably not less than 1,400, further even more preferably not less than 1,500, still further even more preferably not less than 2,000, furthermore preferably not less than 3,000 and even furthermore preferably not less than 3,500, and is also preferably not more than 70,000, more preferably not more than 30,000, even more preferably not more than 20,000, further even more preferably not more than 10,000 and still further even more preferably not more than 5,000.

Meanwhile, the number-average molecular weight of the polymer dispersant may be measured by the method described in Examples below.

In addition, in the case where the component (a) is in the form of an anionic monomer, the acid value of the polymer dispersant is preferably not less than 100 mgKOH/g, more preferably not less than 200 mgKOH/g, even more preferably not less than 300 mgKOH/g and further even more preferably not less than 450 mgKOH/g, and is also preferably not more than 700 mgKOH/g, more preferably not more than 650 mgKOH/g and even more preferably not more than 600 mgKOH/g, from the viewpoint of satisfying both of high dispersibility of the titanium oxide and good storage stability of the resulting water-based ink.

(Production of Polymer Dispersant)

The polymer dispersant may be produced by copolymerizing the aforementioned monomer mixture by known polymerization methods such as a bulk polymerization method, a solution polymerization method, a suspension polymerization method and an emulsion polymerization method. Among these polymerization methods, preferred is the solution polymerization method.

The solvent used in the solution polymerization method is not particularly limited, and is preferably an organic polar solvent. If the organic polar solvent is miscible with water, the organic solvent may be used in the form of a mixture with water. Examples of the organic polar solvents include aliphatic alcohols having not less than 1 and not more than 3 carbon atoms, ketones having not less than 3 and not more than 5 carbon atoms, ethers and esters. Among these organic polar solvents, preferred are aliphatic alcohols, ketones, or a mixed solvent of any of these compounds with water, and more preferred is methyl ethyl ketone or a mixed solvent of methyl ethyl ketone and water.

The polymerization may be carried out in the presence of a polymerization initiator or a chain transfer agent.

Examples of the polymerization initiator include conventionally known radical polymerization initiators, e.g., azo compounds such as 2,2'-azobisisobutyronitrile and 2,2'-azobis(2,4-dimethylvaleronitrile), and organic peroxides such as t-butyl peroxyoctoate and benzoyl peroxide.

Examples of the chain transfer agent include conventionally known chain transfer agents, e.g., mercaptans such as octyl mercaptan and 2-mercaptoethanol, and thiuram disulfides.

In addition, the type of a polymerization chain of the respective monomers to be polymerized is not particularly limited, and may be of any polymerization type including a random type, a block type and a graft type, etc.

The preferred polymerization conditions may vary depending upon the kinds of polymerization initiators, monomers and solvents used, etc. In general, the polymerization temperature is preferably not lower than 30° C. and more preferably not lower than 50° C., and is also preferably not higher than 95° C. and more preferably not higher than 80° C. The polymerization time is preferably not less than 1 hour and more preferably not less than 2 hours, and is also preferably not more than 20 hours and more preferably not more than 10 hours. Furthermore, the polymerization is preferably conducted in a nitrogen gas atmosphere or in an atmosphere of an inert gas such as argon.

After completion of the polymerization reaction, the polymer produced may be isolated from the obtained reaction solution by conventionally known methods such as reprecipitation and removal of the solvent by distillation.

<Production of Titanium Oxide Dispersion>

In the step 1, the titanium oxide and the polymer dispersant are mixed with each other, if required followed by subjecting the resulting mixture to dispersion treatment, to thereby obtain the titanium oxide dispersion.

The details of the titanium oxide are the same as those described previously.

The dispersing method for obtaining the titanium oxide dispersion is not particularly limited. When a mixture containing the titanium oxide, the polymer dispersant and an aqueous medium (hereinafter also referred to merely as a "titanium oxide mixture") is subjected to dispersion treatment, it is possible to more efficiently obtain the titanium oxide dispersion.

(Aqueous Medium)

The aqueous medium as used herein means a medium containing water as a main component. Examples of an organic solvent that may be contained in the aqueous medium as a component other than water include aliphatic alcohols having not less than 1 and not more than 4 carbon atoms; ketones having not less than 3 and not more than 8 carbon atoms; ethers such as ethyl ether, propyl ether, butyl ether and tetrahydrofuran; and esters such as methyl acetate and ethyl acetate. Among these organic solvents, from the viewpoint of improving wettability the organic solvents to the titanium oxide particles, solubility of the polymer dispersant in the organic solvents, and adsorptivity of the polymer dispersant to the titanium oxide particles, more preferred are ketones having not less than 4 and not more than 6 carbon atoms, even more preferred are methyl ethyl ketone and methyl isobutyl ketone, and further even more preferred is methyl ethyl ketone. In the case where the polymer dispersant is synthesized by a solution polymerization method, the solvent used in the solution polymerization method may be directly used as such in the step 1.

The content of water in the aqueous medium is preferably not less than 50% by mass, more preferably not less than 60% by mass, even more preferably not less than 70% by mass and further even more preferably not less than 75% by mass, and is also preferably not more than 100% by mass, more preferably not more than 95% by mass and even more preferably not more than 90% by mass, from the viewpoint of improving environmental conditions.

(Neutralization)

In the case where the carboxy groups as the salt-forming groups contained in the polymer dispersant are at least partially neutralized, the pH value of the resulting dispersion is controlled to not less than 7, preferably not less than 7.5 and more preferably not less than 8.5, and is also preferably controlled to not more than 13 and more preferably not more than 11.

As the neutralizing agent, from the viewpoint of improving storage stability and ejection properties of the resulting dispersion of the white fine particles and the resulting water-based ink, there may be used basic compounds such as alkali metal hydroxides and organic amines. Of these neutralizing agents, preferred are alkali metal hydroxides.

Specific examples of the alkali metal hydroxides include lithium hydroxide, sodium hydroxide, potassium hydroxide and cesium hydroxide. Of these alkali metal hydroxides, preferred are sodium hydroxide and potassium hydroxide.

Specific examples of the organic amines include trimethylamine, ethylamine, diethylamine, triethylamine and triethanolamine. Also, the polymer dispersant may be previously neutralized.

The neutralizing agent is preferably used in the form of an aqueous neutralizing agent solution from the viewpoint of sufficiently and uniformly accelerating the neutralization of the carboxy groups of the polymer dispersant. From the same viewpoint as described above, the concentration of the aqueous neutralizing agent solution is preferably not less than 5% by mass, more preferably not less than 10% by mass and even more preferably not less than 15% by mass, and is also preferably not more than 30% by mass, more preferably not more than 25% by mass and even more preferably not more than 20% by mass.

The neutralization degree of the carboxy groups of the polymer dispersant is preferably not less than 10 mol %, more preferably not less than 20 mol %, even more preferably not less than 25 mol % and further even more preferably not less than 30 mol %, and is also preferably not more than 300 mol %, more preferably not more than 200 mol % and even more preferably not more than 150 mol %, from the viewpoint of improving storage stability, etc., of the resulting dispersion of the white fine particles and the resulting water-based ink.

The neutralization degree as used herein means the value calculated by dividing a mole equivalent number of the neutralizing agent (alkali metal hydroxide) by a mole equivalent number of the carboxy groups of the polymer dispersant. Inherently, the neutralizing degree does not exceed 100%. However, since the neutralization degree of the polymer dispersant as defined in the present invention is calculated from the amount of the neutralizing agent used, the neutralization degree will exceed 100 mol % if the neutralizing agent is used in an excessively large amount.

(Dispersion Treatment of Titanium Oxide Mixture)

The dispersing method for obtaining the titanium oxide dispersion is not particularly limited. The titanium oxide particles may be atomized into fine particles having a desired average particle size only by substantial dispersion treatment. However, it is preferred that the titanium oxide mixture is first subjected to preliminary dispersion treatment, and then further subjected to the substantial dispersion treatment by applying a shear stress thereto so as to control the average particle size of the obtained titanium oxide particles to a desired value.

In the preliminary dispersion treatment, there may be used ordinary mixing and stirring devices that may be generally used in dispersion treatments, such as anchor blades and disper blades. Of these devices, preferred are high-speed stirring mixers.

As a means for applying a shear stress to the titanium oxide mixture in the substantial dispersion treatment, there may be used, for example, kneading machines such as roll mills and kneaders, high-pressure homogenizers such as "MICROFLUIDIZER", and media-type dispersers such as paint shakers and beads mills. Among these devices, the high-pressure homogenizers are preferably used from the viewpoint of reducing a particle size of the titanium oxide. In the case where the substantial dispersion treatment is conducted using the high-pressure homogenizer, the particle size of the titanium oxide can be adjusted to a desired value by controlling the treating pressure and the number of passes through the homogenizer used in the substantial dispersion treatment.

The content of the titanium oxide in the titanium oxide dispersion is preferably not less than 5% by mass, more preferably not less than 10% by mass and even more preferably not less than 12% by mass, and is also preferably not more than 45% by mass, more preferably not more than 35% by mass and even more preferably not more than 25% by mass, from the viewpoint of improving dispersion stability of the titanium oxide dispersion.

The content of the polymer dispersant in the titanium oxide dispersion is preferably not less than 0.5% by mass, more preferably not less than 1.0% by mass and even more preferably not less than L2% by mass, and is also preferably not more than 4.5% by mass, more preferably not more than 3.5% by mass and even more preferably not more than 2.5% by mass, from the viewpoint of enhancing adsorptivity of the polymer dispersant onto the surface of the titanium oxide to uniformly disperse the titanium oxide in the resulting dispersion. Meanwhile, when the polymer dispersant is in the form of a salt, the mass of the polymer dispersant is expressed in terms of an amount of an unneutralized acid thereof (hereinafter defined in the same way).

The mass ratio of the titanium oxide to the polymer dispersant [titanium oxide/polymer dispersant] in the step 1 is preferably not more than 99/1, more preferably not more than 96/4 and even more preferably not more than 93/7, and is also preferably not less than 75/25, more preferably not less than 80/20 and even more preferably not less than 85/15.

<Step 2>

In the step 2, a polymerizable monomer is added to the titanium oxide dispersion obtained in the step 1 to subject the polymerizable monomer to polymerization reaction, thereby obtaining a dispersion of the white fine particles.

(Polymerizable Monomer)

The polymerizable monomer preferably includes a hydrophobic monomer, more preferably at least one monomer selected from the group consisting of a (meth)acrylate monomer and an aromatic group-containing monomer and even more preferably a (meth)acrylate monomer from the viewpoint of improving dispersibility and hiding power of the white fine particles.

Specific examples of the (meth)acrylate monomer include (meth)acrylates containing an alkyl group having not less than 1 and not more than 10 carbon atoms and preferably not less than 1 and not more than 8 carbon atoms, such as methyl (meth)acrylate, ethyl (meth)acrylate, propyl (meth)acrylate, butyl (meth)acrylate and 2-ethylhexyl (meth)acrylate; and alicyclic (meth) acrylates such as isobornyl (meth)acrylate and cyclohexyl (meth)acrylate. Of these (meth)acrylate monomers, from the viewpoint of improving dispersibility and hiding power of the white fine particles, preferred are (meth)acrylates containing an alkyl group having not less than 1 and not more than 8 carbon atoms and more preferably not less than 1 and not more than 6 carbon atoms.

The aromatic group-containing monomer is preferably a vinyl monomer containing an aromatic group having not less than 6 and not more than 22 carbon atoms, and more preferably a styrene-based monomer or an aromatic group-containing (meth) acrylate.

Specific examples of the preferred styrene-based monomer include styrene, 2-methyl styrene, vinyl toluene and divinyl benzene. Among these styrene-based monomers, more preferred are styrene and 2-methyl styrene. Specific examples of the preferred aromatic group-containing (meth) acrylate include phenyl (meth)acrylate, benzyl (meth)acrylate and phenoxyethyl (meth)acrylate.

As the polymerizable monomer, there may be used any two or more of the aforementioned monomers.

In the step 2, in addition to the at least one polymerizable monomer selected from the group consisting of the (meth) acrylate monomer and the aromatic group-containing monomer, an anionic monomer such as a carboxylic acid monomer, a sulfonic acid monomer and a phosphoric acid monomer, and a cationic monomer may also be added. Of these monomers, preferred is the carboxylic acid monomer, and more preferred is (meth)acrylic acid.

In addition, in the step 2, various other monomers such as polyethylene glycol mono(meth)acrylate, methoxy polyethylene glycol mono(meth)acrylate, octoxy polyethylene glycol mono(meth)acrylate and stearoxy polyethylene glycol mono(meth)acrylate may also be used, if necessary.

The content of the at least one polymerizable monomer selected from the group consisting of the (meth)acrylate monomer and the aromatic group-containing monomer in the whole polymerizable monomers added is preferably not less than 80% by mass, more preferably not less than 90% by mass and even more preferably not less than 95% by mass from the viewpoint of improving dispersibility, hiding power and fixing properties of the white fine particles, suppressing increase in viscosity of the resulting ink, and further improving deinking properties of the ink.

The content of the monomers other than the at least one polymerizable monomer selected from the group consisting of the (meth)acrylate monomer and the aromatic group-containing monomer in the whole monomers used in the step 2 is preferably not more than 20% by mass, more preferably not more than 10% by mass and even more preferably not more than 5% by mass from the viewpoint of improving dispersibility and hiding power of the white fine particles.

The method of adding the polymerizable monomer to the titanium oxide dispersion is not particularly limited, and the polymerizable monomer may be added to the dispersion by conventionally known methods such as a monomer dropwise addition method, a monomer batch charging method and a pre-emulsion method, etc.

The polymerizable monomer may be polymerized by conventionally known polymerization methods such as a bulk polymerization method, a solution polymerization method, a suspension polymerization method and an emulsion polymerization method, etc. Among these polymerization methods, preferred are an aqueous system suspension polymerization method and an emulsion polymerization method, more preferred is an emulsion polymerization method. As the emulsion polymerization method, even more preferred is a seed polymerization method.

The aqueous system suspension polymerization method is such a method in which a mixture containing the pigment, the water-soluble polymer dispersant and water is subjected to dispersion treatment by an ordinary method to obtain a pigment dispersion 1, and then the polymerizable monomer is added and mixed in the thus obtained pigment dispersion 1, followed by subjecting the resulting mixture to dispersion treatment, and thereafter the polymerization initiator is added to the resulting dispersion to subject the polymerizable monomer to polymerization reaction at a temperature of 50 to 100° C. while stirring the dispersion.

On the other hand, the seed polymerization method is such a method in which after allowing the polymer dispersant to adsorb onto the surface of the respective titanium oxide particles, the resulting particles as seed particles are uniformly dispersed in an aqueous medium, and then the polymerizable monomer is added and mixed in the resulting dispersion, and further the resulting mixture is subjected to dispersion treatment by an ordinary method to adsorb the polymerizable monomer onto the seed particles, followed by adding the polymerization initiator to the resulting dispersion to subject the polymerizable monomer to emulsion polymerization on the surface of the respective seed particles.

In the following, the emulsion polymerization method, in particular, the seed polymerization method, is explained as a typical example of the polymerization methods.

(Polymerization Initiator)

As the polymerization initiator, any polymerization initiators may be used as long as they can be suitably used in ordinary emulsion polymerization processes. However, a water-soluble polymerization initiator is preferably used. Specific examples of the polymerization initiator include persulfuric acid salts such as potassium persulfate and ammonium persulfate; hydrogen peroxide; organic peroxides such as t-butyl hydroperoxide, benzoyl peroxide and cumene hydroperoxide; azo-based polymerization initiators such as azobisdiisobutyronitrile, 4,4'-azobis(4-carbovaleric acid) and 2,2-azobis(2-amidinopropane) dihydrochloride; and redox-based polymerization initiators. Of these polymerization initiators, from the viewpoint of accelerating polymerization of the polymerizable monomer and improving hiding power of the resulting ink, preferred is an azo-based polymerization initiator.

In the emulsion polymerization method, there may also be used a chain transfer agent. Examples of the chain transfer agent include mercaptans such as n-dodecyl mercaptan, t-dodecyl mercaptan and n-octyl mercaptan; xanthogens such as dimethyl xanthogen disulfide and diisobutyl xanthogen disulfide; and dipentene, indene, 1,4-cyclohexadiene, dihydrofuran and xanthene.

In the step 2, in order to enhance polymerization stability, a surfactant may also be added. As the surfactant, there may be used conventionally known surfactants such as anionic or nonionic surfactants for emulsion polymerization.

The amount of the polymerizable monomer used is preferably not less than 1% by mass, more preferably not less than 2% by mass and even more preferably not less than 3% by mass, and is also preferably not more than 20% by mass, more preferably not more than 15% by mass and even more preferably not more than 10% by mass, on the basis of the composition of the whole reaction system used in the polymerization reaction in the step 2, from the viewpoint of improving dispersibility and hiding power of the resulting white fine particles.

The mass ratio of the polymerizable monomer to the titanium oxide [polymerizable monomer/titanium oxide] in the step 2 is preferably not less than 0.1, more preferably not less than 0.2, even more preferably not less than 0.3 and further even more preferably not less than 0.5, and is also preferably not more than 2.0, more preferably not more than 1.5 and even more preferably not more than 1.2, from the viewpoint of improving dispersibility and hiding power of the resulting white fine particles.

The mass ratio of the polymerizable monomer to the polymer dispersant [polymerizable monomer/polymer dispersant] in the step 2 is preferably not less than 1, more preferably not less than 3, even more preferably not less than 5 and further even more preferably not less than 8, and is also preferably not more than 50, more preferably not more than 35 and even more preferably not more than 25, from the viewpoint of improving dispersibility, hiding power and fixing properties of the resulting white fine particles, suppressing increase in viscosity of the resulting ink, and further improving deinking properties of the ink.

The polymerizable monomer is preferably continuously added dropwise to the titanium oxide dispersion from the viewpoint of well controlling polymerization thereof. The velocity of dropwise addition of the polymerizable monomer is preferably not less than 0.01 mL/h·g, more preferably not less than 0.05 mL/h·g and even more preferably not less than 0.07 mL/h·g, and is also preferably not more than 2.0 mL/h·g, more preferably not more than 1.5 mL/h·g and even more preferably not more than 1.0 mL/h·g. The polymerizable monomer may be added dropwise while varying stepwise the velocity of dropwise addition of the monomer, from the viewpoint of well controlling polymerization thereof.

The temperature used upon the polymerization reaction in the step 2 may be appropriately controlled depending upon a temperature of decomposition of the polymerization initiator. The polymerization temperature is preferably not lower than 50° C., more preferably not lower than 60° C. and even more preferably not lower than 70° C. from the viewpoint of improving the reactivity, and is also preferably not higher than 90° C. and more preferably not higher than 85° C. from the viewpoint of improving a molecular weight distribution of the resulting polymer.

In the present invention, the thus obtained polymer may be further subjected to crosslinking treatment from the viewpoint of improving storage stability and hiding power of the resulting water-based ink. Examples of a crosslinking agent used in the crosslinking treatment include a compound containing two or more reactive functional groups in a molecule thereof, such as a compound containing two or more epoxy groups in a molecule thereof. Examples of the preferred compound containing two or more epoxy groups in a molecule thereof include ethylene glycol diglycidyl ether, trimethylolpropane polyglycidyl ether, etc.

[Properties, etc., of White Fine Particles]

In the dispersion of the white fine particles, from the viewpoint of obtaining a white ink that is capable of satisfying not only excellent dispersibility and hiding power of the white fine particles, but also excellent fixing properties on a printed material, suppression of increase in viscosity of the ink and good deinking properties at a high level, the mass ratio of precipitated particles (precipitated component) to non-precipitated particles (non-precipitated component) [precipitated component/non-precipitated component] when subjecting the dispersion to centrifugal separation under the following conditions is preferably from 100/0 to 85/15, more preferably from 100/0 to 89/11, even more preferably from 100/0 to 90/10, further even more preferably from 100/0 to 92/8, still further even more preferably from 100/0 to 94/6 and furthermore preferably from 100/0 to 96/4.

Conditions of Centrifugal Separation:

The water dispersion of the white fine particles having a solid content of 20% by mass is subjected to centrifugal separation using a centrifuge in an atmosphere of 25° C. at a relative centrifugal acceleration of 170 G for 1 hour.

The non-precipitated component as described herein means a component containing particles constituted of a polymer containing no titanium oxide as a main component.

In addition, in the thus obtained white fine particles, the mass ratio of the titanium oxide to the polymer component [titanium oxide/polymer component] is preferably not more than 90/10, more preferably not more than 80/20, even more preferably not more than 70/30, further even more preferably not more than 65/35 and still further even more preferably not more than 60/40, and is also preferably not less than 10/90, more preferably not less than 15/85, even more preferably not less than 20/80, further even more preferably not less than 25/75, still further even more preferably not less than 30/70 and furthermore preferably not less than 35/65.

The mass of the polymer component as used herein means a total mass of the polymer dispersant used in the step 1 and the polymer obtained by the seed polymerization in the step 2. The polymer component preferably further contains a polymer containing a constitutional unit derived from at least one polymerizable monomer selected from the group consisting of a (meth)acrylate and an aromatic group-containing monomer, etc., in addition to the underlying polymer dispersant containing the constitutional unit derived from at least one monomer selected from the group consisting of (meth)acrylic acid and an alkyl (meth)acrylate, etc.

More specifically, the mass of the polymer component is a total mass of the polymers respectively containing a constitutional unit derived from at least one monomer selected from the group consisting of (meth)acrylic acid, an aromatic group-containing monomer and an alkyl (meth) acrylate, etc. The polymer component is preferably in the form of a polymer containing a constitutional unit derived from at least one monomer selected from the group consisting of a (meth)acrylic monomer and an aromatic group-containing monomer, more preferably in the form of a polymer containing a constitutional unit derived from a (meth)acrylic monomer, and even more preferably in the form of a polymer containing a constitutional unit derived from at least one monomer selected from the group consisting of (meth)acrylic acid and an alkyl (meth) acrylate.

The mass ratio of the titanium oxide to the polymer component [titanium oxide/polymer component] in the white fine particles may be calculated from the respective masses of the titanium oxide and the polymer component which are determined from amounts of the raw materials charged upon production of the white fine particles, thermogravimetry (TG), etc.

The volume median particle size ($D_{50}$) of the white fine particles in the dispersion of the white fine particles is preferably not less than 50 nm and not more than 680 nm and more preferably not less than 100 nm and not more than 600 nm from the viewpoint of improving hiding power of the white fine particles.

The volume median particle size ($D_{50}$) of the white fine particles is more preferably not less than 100 nm, even more preferably not less than 150 nm, further even more preferably not less than 200 nm, still further even more preferably not less than 250 nm and furthermore preferably not less than 300 nm, and is also more preferably not more than 600 nm, even more preferably not more than 580 nm, further even more preferably not more than 500 nm and still further even more preferably not more than 400 nm.

Meanwhile, the volume median particle size ($D_{50}$) as used herein means a particle size at which a cumulative volume frequency measured on the basis of a volume fraction of the particles and accumulated from a smaller particle size side thereof is 50%, and may be determined by the method described in Examples below.

[Water-Based Ink]

The water-based ink of the present invention contains the white fine particles of the present invention, in which the titanium atomic fraction of the surface of the respective white fine particles as measured at a photoelectron takeoff angle of 45° by XPS is not more than 5 atomic %.

The water-based ink of the present invention is preferably used as a water-based ink for ink-jet printing.

The water-based ink of the present invention may be produced by adding water to the dispersion of the white fine particles according to the present invention, followed by mixing the resulting dispersion. The water-based ink may also be compounded with various additives that may be usually used in water-based inks, such as an organic solvent, a surfactant, a wetting agent, a penetrant, a dispersant, a viscosity controller, a defoaming agent, a mildew-proof agent, a rust preventive and an ultraviolet absorber, if required.

Examples of the organic solvent that may be contained in the water-based ink include polyhydric alcohols, polyhydric alcohol alkyl ethers, polyhydric alcohol aryl ethers, cyclic carbonates, nitrogen-containing heterocyclic compounds, amides, amines and sulfur-containing compounds. Of these organic solvents, preferred is at least one organic solvent selected from the group consisting of polyhydric alcohols and polyhydric alcohol alkyl ethers, and more preferred is at least one organic solvent selected from the group consisting of diethylene glycol, propylene glycol, dipropylene glycol, 1,2-butanediol, 1,2-hexanediol, glycerin, diethylene glycol monomethyl ether and dipropylene glycol monomethyl ether.

Examples of the surfactant that may be contained in the water-based ink include a nonionic surfactant, an anionic surfactant, an amphoteric surfactant, a silicone-based surfactant and a fluorine-based surfactant. Of these surfactants, preferred is at least one surfactant selected from the group consisting of a nonionic surfactant and a silicone-based surfactant.

In the water-based ink of the present invention, the titanium atomic fraction, the contents of respective components therein and the ink properties may be determined as follows from the viewpoint of satisfying both of high hiding power and good bending resistance in the resulting printed material.

(Titanium Atomic Fraction Measured by XPS)

In the water-based ink of the present invention, from the viewpoint of satisfying both of high hiding power and good bending resistance in the resulting printed material, the titanium atomic fraction of the surface of the respective white fine particles as measured at a photoelectron takeoff angle of 45° by XPS is preferably not more than 5 atomic %, more preferably not more than 4 atomic %, even more preferably not more than 3 atomic %, further even more preferably not more than 2 atomic % and most preferably 0 atomic %.

The measurement of the titanium atomic fraction by XPS may be conducted by the method described in Examples below.

(Content of Titanium Oxide)

The content of the titanium oxide in the water-based ink is preferably not less than 1% by mass, more preferably not less than 2% by mass, even more preferably not less than 2.5% by mass and further even more preferably not less than 3% by mass from the viewpoint of improving hiding power and whiteness of the water-based ink, and is also preferably not more than 20% by mass, more preferably not more than 17% by mass and even more preferably not more than 15% by mass from the viewpoint of improving redispersibility of the water-based ink.

(Content of Organic Solvent)

The content of the organic solvent in the water-based ink is preferably not less than 10% by mass, more preferably not less than 15% by mass and even more preferably not less than 25% by mass from the viewpoint of improving ejection stability of the water-based ink when used in an ink-jet printing apparatus, etc., and is also preferably not more than 50% by mass, more preferably not more than 40% by mass and even more preferably not more than 35% by mass from the same viewpoint as described above.

(Content of Water)

The content of water in the water-based ink is preferably not less than 40% by mass and more preferably not less than 50% by mass, and is also preferably not more than 80% by mass and more preferably not more than 70% by mass, from the viewpoint of reducing burden on the environment.

(Properties of Water-Based Ink)

The pH value of the water-based ink as measured at 20° C. is preferably not less than 5.5, more preferably not less than 6.0 and even more preferably not less than 6.5 from the viewpoint of improving ejection stability of the water-based ink when used in an ink-jet printing apparatus, etc., and is also preferably not more than 11.0, more preferably not more than 10.0, even more preferably not more than 9.5 and further even more preferably not more than 9.0 from the viewpoint of improving the resistance of members to the ink and suppressing skin irritation. The pH value of the water-based ink as measured at 20° C. may be measured by the method described in Examples below.

The viscosity of the water-based ink as measured at 32° C. is preferably not less than 2.0 mPa·s, more preferably not less than 3.0 mPa·s and even more preferably not less than 3.5 mPa·s from the viewpoint of improving ejection stability of the water-based ink when used in an ink-jet printing apparatus, etc., and is also preferably not more than 12 mPa·s, more preferably not more than 9.0 mPa·s, even more preferably not more than 7.0 mPa·s, further even more preferably not more than 5.5 mPa·s and still further even more preferably not more than 4.5 mPa·s from the same viewpoint as described above.

The viscosity of the water-based ink as measured at 32° C. may be measured by the method described in Examples below.

(Printing Medium)

Examples of a printing medium to which the ink containing the white fine particles of the present invention can be applied include a high-liquid absorbing plain paper, a low-liquid absorbing coated paper and a non-liquid absorbing resin film. The ink of the present invention can also exhibit excellent fixing properties even on the non-liquid absorbing resin film.

As the resin film, there may be used a transparent synthetic resin film. Examples of the transparent synthetic resin film include a polyester film, a polyvinyl chloride film, a polypropylene film, a polyethylene film, a nylon film and the like. Among these films, more preferred are a polyester film and an oriented polypropylene film, and more preferred are a polyester film such as a polyethylene terephthalate (PET) film subjected to corona discharge treatment, and an oriented polypropylene film such as a biaxially oriented polypropylene (OPP) film subjected to corona discharge treatment.

EXAMPLES

In the following Synthesis Examples, Production Examples, Examples and Comparative Examples, "%" indicates "% by mass" unless otherwise specified.

(1) Measurement of Number-Average Molecular Weight of Polymer Dispersant

The number-average molecular weight of the polymer dispersant was measured by gel permeation chromatography [GPC apparatus: "HLC-8120GPC" available from Tosoh Corporation; columns: "TSK-GEL, α-M"×2 available from Tosoh Corporation: flow rate: 1 mL/min] using a solution prepared by dissolving phosphoric acid and lithium bromide in N,N-dimethyl formamide such that concentrations of phosphoric acid and lithium bromide in the resulting solution were 60 mmol/L and 50 mmol/L, respectively, as an eluent, and using monodisperse polystyrenes having previously known molecular weights as a reference standard substance.

(2) Measurement of Average Primary Particle Size of Titanium Oxide

The average primary particle size of the titanium oxide was determined by the following method. That is, using a transmission electron microscope "JEM-2100" available form JEOL Ltd., 500 primary particles of the titanium oxide were extracted by image analysis to measure their particle sizes and calculate an average value of the thus measured particle sizes as an arithmetical mean particle diameter thereof. Meanwhile, in the case where the respective titanium oxide particles had a major axis diameter and a minor axis diameter, the average primary particle size of the titanium oxide was calculated by using the major axis diameters thereof.

(3) Measurement of Solid Content of Titanium Oxide Dispersion

Using an infrared moisture meter "FD-230" available from Kett Electric Laboratory, 5 g of a sample to be measured was dried at a drying temperature of 150° C. under a measuring mode 96 (monitoring time: 2.5 minutes/variation range: 0.05%) to measure a water content (%) of the sample to be measured. The solid content of the sample to be measured was calculated according to the following formula:

Solid Content (%)=100−Water Content(%) of Sample to be Measured (4) Measurement of Mass Ratio of Precipitated Component to Non-Precipitated Component [Precipitated Component/Non-Precipitated Component] in Dispersion of White Fine Particles A sample to be measured was diluted with ion-exchanged water such that a solid content of the resulting dispersion was 20% by mass, and 100 g of the dispersion was charged into a centrifuge "CR-22G" equipped with a rotor "R12A" available from Hitachi Koki Co., Ltd. Then, the centrifuge thus charged was operated in an atmosphere of 25° C. at a rotating speed of 100 rpm (relative centrifugal acceleration (RCF): 170 G) for 1 hour. Next, a supernatant was removed from the dispersion to separate a precipitated component therefrom, and the precipitated component was dried at 70° C. under 8 kPa for 8 hours, followed by measuring a mass of the precipitated component. The mass of the non-precipitated component was determined by subtracting the mass of the precipitated component from the mass of the whole solid components of the sample to calculate the mass ratio of the precipitated component to the non-precipitated component [precipitated component/non-precipitated component].

(5) Measurement of Volume Median Particle Sizes ($D_{50}$) of Particles in Titanium Oxide Dispersion and Dispersion of White Fine Particles Using a laser diffraction/scattering-type particle size distribution measuring apparatus "LA-920" available from HORIBA Ltd., a cell for the measurement was charged with a sample dispersion and then with distilled water to measure a volume median particle size ($D_{50}$) of the particles in the dispersion at a concentration at which an absorbance thereof fell within an adequate range.

(6) Measurement of Titanium Atomic Fraction by X-Ray Photoelectron Spectroscope (XPS)

Using a freeze dryer "FDU-2100" and "DRC-1000" (tradenames) available from TOKYO RIKAKIKAI CO., LTD., 30 g of the water dispersion was vacuum-dried at −25° C. for 1 hour, at −10° C. for 10 hours and at 25° C. for 4 hours, respectively, until a water content of the water dispersion was reduced to 1% or less, thereby obtaining a powder.

Next, the thus obtained powder was subjected to XPS measurement using the following apparatus to read the value of an atomic percent of Ti indicated on the apparatus.

[Measuring Conditions]

Apparatus: "PHI Quantera SXM" (tradename) available from ULVAC-PHI Inc.

X-ray source: Monochromatized Al Kα, 1486.6 eV, 25 W, 15 kV

Beam system: 100 μm

Measurement range: 1000×500 μm$^2$

Pass energy: 280.0 eV (survey) 112.0 eV (narrow)

Step: 1.00 eV (survey) 0.10 eV (narrow)

Charge correction: Newtralizer and Ar irradiation

Photoelectron takeoff angle: 45 degree or 20 degree (7) pH of Ink

The pH value of the ink was measured at 20° C. using a bench-top pH meter "F-71" available from Horiba Ltd., equipped with a pH electrode "6367-10D" available from Horiba Ltd.

Synthesis Example 1-1

Synthesis of Polymer Dispersant

A 100 mL four-necked round bottom flask equipped with a thermometer, a 100 mL nitrogen bypass-fitted dropping funnel and a refluxing device was charged with an initially charged monomer solution containing 1 g of butyl acrylate, 2 g of acrylic acid, 2 g of methyl ethyl ketone (as a solvent), 0.03 g of 2,2'-azobis(2,4-dimethylvaleronitrile) "V-65" (tradename) as a polymerization initiator available from Wako Pure Chemical Industries, Ltd., and 0.15 g of a 15%-conc. 2-mercaptoethanol aqueous solution as a chain transfer agent available from TOYOBO Co., Ltd., and the contents of the flask were mixed with each other using a magnetic stirrer. The resulting mixture was bubbled with nitrogen for 10 minutes and then heated to 77° C. in a water bath, followed by stirring the mixture for 30 minutes.

Thereafter, the dropping funnel was charged with a dropping solution containing 8.9 g of butyl acrylate, 18.1 g of acrylic acid, 18 g of methyl ethyl ketone (as a solvent), 0.27 g of the aforementioned polymerization initiator "V-65" and 1.35 g of the aforementioned chain transfer agent, and then the dropping solution was added dropwise into the flask over 3 hours. After that, the contents of the flask were maintained at 77° C. for 3 hours to complete the reaction therebetween. Then, the resulting reaction solution was charged into 1 L of n-hexane to subject the solution to reprecipitation. The resulting reprecipitated product was then dried at 70° C. under 8 kPa for 8 hours, thereby obtaining a polymer dispersant having a number-average molecular weight of 4700.

The resulting polymer dispersant was neutralized with sodium hydroxide until a neutralization degree of the polymer reached 30 mol % to thereby obtain a water dispersion containing 2% by mass of the polymer dispersant. When observing the water dispersant of the polymer dispersant under ordinary light, Tyndall phenomenon was recognized therein. Therefore, it was confirmed that the polymer dispersant was in the form of a water-insoluble polymer.

Production Examples 1-1 to 1-6 and Comparative Production Example 1-1

(Production of Titanium Oxide Dispersions 1-1 to 1-7)

A 200 mL glass beaker was charged with 52 g of ion-exchanged water, 1.0 g of the polymer dispersant obtained in Synthesis Example 1-1, 0.11 g of sodium hydroxide (corresponding to such an amount that a neutralization degree of the polymer became 30 mol %) and 10 g of titanium oxide shown in Table 1, and the contents of the glass beaker were dispersed for 20 minutes using an ultrasonic disperser "US-3001" available from NISSEI Corporation while stirring with a magnetic stirrer. Thereafter, the resulting dispersion was mixed and dispersed at 20° C. for 8 hours using a beads mill-type disperser "Ultra Apex Mill Model No. UAM-05" available from Kotobuki Industries Co., Ltd., filled with zirconia beads having a particle size of 1.0 mm as media particles. Then, the resulting mixture was allowed to pass through a 200-mesh wire mesh to remove the zirconia beads therefrom, thereby obtaining titanium oxide dispersions 1-1 to 1-7 (solid content: 17.6% by mass). The results are shown in Table 1.

Comparative Production Example 1-2

Production of Titanium Oxide Dispersion 1-8

The same procedure as in Production Example 1-1 was repeated except for using no polymer dispersant, thereby obtaining a titanium oxide dispersion 1-8 (solid content: 16.0% by mass).

The details of the titanium oxides used in the respective Production Examples, etc., (as shown in Table 1) are as follows.

- JR-405: Rutile-type Al-treated titanium oxide; average primary particle size: 210 nm; available from TAYCA Corporation
- CR-80: Rutile-type Al/Si-treated titanium oxide; average primary particle size: 250 nm; available from Ishihara Sangyo Kaisha, Ltd.
- JR: Rutile-type untreated titanium oxide; average primary particle size: 270 nm; available from TAYCA Corporation
- R-930: Rutile-type Al/Zn-treated titanium oxide; average primary particle size: 250 nm; available from Ishihara Sangyo Kaisha, Ltd.
- MT-600B: Rutile-type untreated titanium oxide; average primary particle size: 50 nm; available from TAYCA Corporation
- KR-310: Rutile-type untreated titanium oxide; average primary particle size: 400 nm; available from Titan Kogyo, Ltd.
- TR-92: Rutile-type Al/Zr-treated titanium oxide; average primary particle size: 280 nm; available from Huntsmann Corporation Industries, Ltd., and the contents of the flask were bubbled with nitrogen for 10 minutes.

Separately, a 20 mL Hamilton gastight syringe was charged with a mixture of 1.4 g of butyl acrylate (BA) and 3.3 g of methyl methacrylate (MMA), and mounted to a syringe pump. The aforementioned eggplant-shaped flask was dipped in a water bath at 72° C., and the BA/MMA mixture in the syringe was added dropwise at a dropping velocity of 0.9 g/h (0.1 mL/h·g $TiO_2$) into the reaction solution in the flask. After completion of the dropwise addition, a mixture of 2.8 g of butyl acrylate (BA) and 6.5 g of methyl methacrylate (MMA) was charged into the gastight syringe mounted to the syringe pump, and the BA/MMA mixture was added dropwise at a dropping velocity of 2.5 g/h (0.28 mL/h·g $TiO_2$) into the reaction solution in the flask. After completion of the dropwise addition, the contents of the flask were reacted at 72° C. for 1 hour, and ion-exchanged water was added to the flask to control a solid content of the resulting reaction solution to 30% by mass, thereby obtaining a white fine particle dispersion A1. The results are shown in Table 2.

Examples A2 to A9 and Comparative Examples A1 and A2

Production of White Fine Particle Dispersions A2 to A11

The same procedure as in Example A-1 was repeated except that the kinds and amounts of the monomers used in Example A-1 were changed to those shown in Table 2, thereby obtaining white fine particle dispersions A2 to A11. The results are shown in Table 2.

TABLE 1

|  | Production Examples | | | | | | Comparative Production Examples | |
|---|---|---|---|---|---|---|---|---|
|  | 1-1 | 1-2 | 1-3 | 1-4 | 1-5 | 1-6 | 1-1 | 1-2 |
| Kind of titanium oxide dispersion | 1-1 | 1-2 | 1-3 | 1-4 | 1-5 | 1-6 | 1-7 | 1-8 |
| Composition formulated (g) | | | | | | | | |
| Titanium oxide | | | | | | | | |
| JR-405 (Al-treated) | 10 | | | | | | 10 | |
| CR-80 (Al/Si-treated) | | 10 | | | | | | |
| JR (untreated) | | | 10 | | | | | |
| R-930 (Al/Zn-treated) | | | | 10 | | | | |
| MT-600B (untreated) | | | | | 10 | | | |
| KR-310 (untreated) | | | | | | 10 | | |
| TR-92 (Al/Zr-treated) | | | | | | | 10 | |
| Polymer dispersant | 1.0 | 1.0 | 1.0 | 1.0 | 1.0 | 1.0 | 1.0 | — |
| Sodium hydroxide | 0.11 | 0.11 | 0.11 | 0.11 | 0.11 | 0.11 | 0.11 | 0.11 |
| Ion-exchanged water | 52 | 52 | 52 | 52 | 52 | 52 | 52 | 53 |

Example A1

Production of White Fine Particle Dispersion A1

A 100 mL two-necked eggplant-shaped flask equipped with a three-way cock and a septum seal was charged with 60 g of the titanium oxide dispersion 1-1 obtained in Production Example 1-1 and 0.03 g of a water-soluble azo polymerization initiator "V-501" (tradename; 4,4'-azobis(4-carbovaleric acid)) available from Wako Pure Chemical

Comparative Example A3

Production of White Fine Particle Dispersion A12

A 1000 mL two-necked eggplant-shaped flask equipped with a three-way cock and a septum seal was charged with 111 g of a titanium oxide colloid "Ti-Nanoxide D/SP" (colloidal anatase particles; solid content: 18%) available from SOLARONIX SA (titanium oxide as a solid component: 20 g; water 91 g), 400 g of ion-exchanged water and 5 g of an anionic polymerizable surfactant "Aqualon KH-10" available from DKS Co., Ltd., and the contents of the flask were stirred using a magnetic stirrer for 0.5 hour. Next, 0.03 g of a water-soluble azo polymerization initiator "V-501" (tradename; 4,4'-azobis(4-carbovaleric acid)) available from Wako Pure Chemical Industries, Ltd., was added to 516 g of the whole amount of the dispersion in the flask, and the contents of the flask were bubbled with nitrogen for 10 minutes.

Separately, a 50 mL Hamilton gastight syringe was charged with a mixture of 5 g of dicyclopentanyl methacrylate and 5 g of dodecyl methacrylate, and mounted to a syringe pump. The aforementioned eggplant-shaped flask was dipped in a water bath at 72° C., and the monomer mixture in the syringe was added dropwise at a dropping velocity of 0.9 g/h (0.1 mL/h·g $TiO_2$) into the reaction solution in the flask. After the elapse of 5.5 hours, the dropping velocity was increased to 2.5 g/h (0.28 mL/h·g $TiO_2$) at which the whole amount of the monomer mixture was added dropwise into the reaction solution in the flask. After completion of the dropwise addition, the contents of the flask were reacted at 72° C. for 1 hour, and ion-exchanged water was added to the flask to control a solid content of the resulting dispersion to 30% by mass, thereby obtaining a white fine particle dispersion A12. The results are shown in Table 2.

Comparative Example A4

Production of White Fine Particle Dispersion A13

A 100 mL two-necked eggplant-shaped flask equipped with a three-way cock and a septum seal was charged with 52 g of ion-exchanged water, 1.0 g of the polymer dispersant obtained in Synthesis Example 1-1 and 0.11 g of sodium hydroxide, and the contents of the flask were dispersed for 20 minutes using an ultrasonic disperser "US-3001" available from NISSEI Corporation while stirring to prepare a polymer dispersion. Then, 0.03 g of a water-soluble azo polymerization initiator "V-501" (tradename; 4,4'-azobis(4-carbovaleric acid)) available from Wako Pure Chemical Industries, Ltd., was charged into the flask, and the contents of the flask were bubbled with nitrogen for 10 minutes to prepare a reaction solution.

Separately, a 20 mL Hamilton gastight syringe was charged with a mixture of 1.4 g of butyl acrylate (BA) and 3.3 g of methyl methacrylate (MMA), and mounted to a syringe pump. The aforementioned eggplant-shaped flask was dipped in a water bath at 72° C., and the BA/MMA mixture in the syringe was added dropwise at a dropping velocity of 0.9 g/h into the above-prepared reaction solution in the flask. After completion of the dropwise addition, a mixture of 2.8 g of butyl acrylate (BA) and 6.5 g of methyl methacrylate (MMA) was charged into the gastight syringe mounted to the syringe pump, and the BA/MMA mixture was added dropwise at a dropping velocity of 2.5 g/h into the flask. After completion of the dropwise addition, the contents of the flask were reacted at 72° C. for 1 hour, thereby obtaining a polymer dispersion.

A 100 mL glass beaker was charged with 64 g of the resulting polymer dispersion and 10 g of titanium oxide (JR-405), and the contents of the glass beaker were dispersed for 20 minutes using an ultrasonic disperser "US-3001" available from NISSEI Corporation while stirring with a magnetic stirrer. Thereafter, the resulting dispersion was mixed and dispersed at 20° C. for 8 hours using a beads mill-type disperser "Ultra Apex Mill Model No. UAM-05" available from Kotobuki Industries Co., Ltd., filled with zirconia beads having a particle size of 1.0 mm as media particles. Then, the resulting mixture was allowed to pass through a 200-mesh wire mesh to remove the zirconia beads therefrom, and ion-exchanged water was added to the flask to control a solid content of the resulting dispersion to 30% by mass, thereby obtaining a white fine particle dispersion A13. The results are shown in Table 2.

TABLE 2

|  |  | Examples | | | | | | | | | Comparative Examples | | | |
| --- | --- | --- | --- | --- | --- | --- | --- | --- | --- | --- | --- | --- | --- | --- |
|  |  | A1 | A2 | A3 | A4 | A5 | A6 | A7 | A8 | A9 | A1 | A2 | A3 | A4 |
| Kind of white fine particle dispersion | | A1 | A2 | A3 | A4 | A5 | A6 | A7 | A8 | A9 | A10 | A11 | A12 | A13 |
| Kind of titanium oxide dispersion | | 1-1 | 1-2 | 1-3 | 1-4 | 1-5 | 1-6 | 1-1 | 1-1 | 1-1 | 1-7 | 1-8 | Colloid | Polymer dispersion |
| Composition formulated (g) | | | | | | | | | | | | | | |
| Titanium oxide dispersion | | 60 | 60 | 60 | 60 | 60 | 60 | 79.7 | 30 | 60 | 60 | 60 | — | 53.1[1] |
| First stage monomer | BA | 1.4 | 1.4 | 1.4 | 1.4 | 1.4 | 1.4 | 1.4 | 1.4 | | 1.4 | 1.4 | | 1.4 |
|  | MMA | 3.3 | 3.3 | 3.3 | 3.3 | 3.3 | 3.3 | 3.3 | 3.3 | | 3.3 | 3.3 | | 3.3 |
|  | Styrene | | | | | | | | | 4.7 | | | | |
| Second stage monomer | BA | 2.8 | 2.8 | 2.8 | 2.8 | 2.8 | 2.8 | 2.8 | 2.8 | | 2.8 | 2.8 | | 2.8 |
|  | MMA | 6.5 | 6.5 | 6.5 | 6.5 | 6.5 | 6.5 | 6.5 | 6.5 | | 6.5 | 6.5 | | 6.5 |
|  | Styrene | | | | | | | | | 9.3 | | | | |
| Initiator | "V-501" | 0.03 | 0.03 | 0.03 | 0.03 | 0.03 | 0.03 | 0.03 | 0.03 | 0.03 | 0.03 | 0.03 | | 0.03 |
| Mass ratio [precipitated component/non-precipitated component] | | 100/0 | 96/4 | 98/2 | 99/1 | 99/1 | 96/4 | 98/2 | 95/5 | 98/2 | 90/10 | 85/15 | 82/18 | 77/23 |
| Mass ratio (ratio between components charged) [titanium oxide/polymer component] | | 39/61 | 39/61 | 39/61 | 39/61 | 39/61 | 39/61 | 45/55 | 25/75 | 39/61 | 39/61 | 40/60 | 39/61 | 41/59[2] |
| Volume median particle size $D_{50}$ (nm) | | 357 | 372 | 331 | 339 | 102 | 572 | 310 | 542 | 371 | 308 | 398 | 30 | 373 |

TABLE 2-continued

|  | Examples | | | | | | | | | Comparative Examples | | | |
| --- | --- | --- | --- | --- | --- | --- | --- | --- | --- | --- | --- | --- | --- |
|  | A1 | A2 | A3 | A4 | A5 | A6 | A7 | A8 | A9 | A1 | A2 | A3 | A4 |
| Solid content (%) | 30 | 30 | 30 | 30 | 30 | 30 | 30 | 30 | 30 | 30 | 30 | 30 | 30 |
| Ti % (XPS: atomic %) | 0 | 2 | 0 | 0 | 0 | 6 | 5 | 2 | 3 | 9 | 29 | 18 | 18 |

Note:
[1] Mass of polymer dispersion (containing 1 g of polymer dispersant/resin)

Note:
[2] After conducting polymerization reaction without titanium oxide (total amount of polymer dispersant/resin: 14.3 g), 10 g of titanium oxide was dispersed.

Examples B1 to B16 and Comparative Examples B1 to B5

Production of Water-Based Inks B1 to B21

A glass container was charged with the respective white fine particle dispersions A1 to A13 obtained in Examples A1 to A9 and Comparative Examples A1 to A4 and ion-exchanged water, and the contents of the glass container were stirred with a magnetic stirrer for 10 minutes, thereby obtaining ink mixtures A1 to A13.

Separately, propylene glycol, ethylene glycol, "SURFYNOL 104PG50" (acetylene-based nonionic surfactant; propylene glycol solution; active ingredient content: 50%) available from Nissin Chemical Co., Ltd., and "EMULGEN 120" (nonionic surfactant; polyoxyethylene lauryl ether) available from Kao Corporation were respectively prepared and charged into a glass container in amounts shown in Tables 3 and 4, and the contents of the glass container were stirred for 10 minutes using a magnetic stirrer, thereby obtaining a mixture B.

Next, while stirring the respective mixtures A1 to A13, the mixture B was added thereto, and the resulting mixture was successively stirred for 1 hour. Thereafter, the obtained dispersion was subjected to filtration treatment through a 5 μm-mesh disposable membrane filter "Minisart" available from Sartorius Inc., thereby obtaining respective water-based inks B1 to B21.

Incidentally, in Example B2 and Comparative Example B1, the titanium oxide dispersion 1-1 obtained in Production Example 1-1 was used in the form of a dispersion 1 prepared by controlling a solid content thereof to 30% by mass.

In addition, in Example B3, the polymer dispersion obtained during the production step of Comparative Example A4 was used in the form of an emulsion 1 prepared by controlling a solid content thereof to 30% by mass.

The properties of the thus obtained water-based inks are shown in Tables 3 and 4.

<Evaluation of Ink>
<Hiding Power of Printed Material>

Using an ink-jet printer "Model No.: EM-930C" (piezo-electric type) available from Seiko Epson Co., Ltd., solid image printing was conducted in Fine Mode on an OHP sheet "MJOHPS1N" available from Seiko Epson Co., Ltd., to obtain a printed material. The printed image formed on the resulting printed material was subjected to measurement of a color difference ΔE thereof on a whiteness standard plate (visual density=0.05) and a blackness standard plate (visual density=1.86) as a background using a spectrophotometric color difference meter "SE-2000" available from Nippon Denshoku Industries Co., Ltd.

<Bending Resistance of Printed Material>

A central portion of the printed image formed on the aforementioned printed material was cut into a test piece having a width of 2 cm. The test piece was folded in two such that the printed image thereof faced outside. The condition of the two-folded portion of the test piece was visually observed to examine whether or not any lack of the printed image was present in the 2 cm width range of the folded portion and evaluate bending resistance of the printed material from a width (mm) of the lack.

TABLE 3

|  |  | Examples | | | | | | Comparative Examples | | | | Examples | |
| --- | --- | --- | --- | --- | --- | --- | --- | --- | --- | --- | --- | --- | --- |
|  |  | B1 | B2 | B3 | B4 | B5 | B6 | B1 | B2 | B3 | B4 | B7 | B8 |
| Kind of water-based ink | | B1 | B2 | B3 | B4 | B5 | B6 | B7 | B8 | B9 | B10 | B11 | B12 |
| Composition formulated (g) | | | | | | | | | | | | | |
| Kind of white fine | A1 | 10 | 9.5 | 9 | | | | 9 | | | | 37.5 | 2.5 |
| particle dispersion | A2 | | | | 10 | | | | | | | | |
|  | A3 | | | | | 10 | | | | | | | |
|  | A4 | | | | | | 10 | | | | | | |
|  | A10 | | | | | | | | 10 | | | | |
|  | A11 | | | | | | | | | 10 | | | |
|  | A13 | | | | | | | | | | 10 | | |
| Dispersion 1 | | | 0.5 | | | | | 1 | | | | | |
| Emulsion 1 | | | | 1 | | | | | | | | | |
| Organic solvent | Propylene glycol | 12 | 12 | 12 | 12 | 12 | 12 | 12 | 12 | 12 | 12 | 12 | 12 |
| Surfactant | "SURFYNOL 104PG50" | 0.6 | 0.6 | 0.6 | 0.6 | 0.6 | 0.6 | 0.6 | 0.6 | 0.6 | 0.6 | 0.6 | 0.6 |
|  | "EMULGEN 120" | 0.6 | 0.6 | 0.6 | 0.6 | 0.6 | 0.6 | 0.6 | 0.6 | 0.6 | 0.6 | 0.6 | 0.6 |
| Ion-exchanged water | | 13 | 13 | 13 | 13 | 13 | 13 | 13 | 13 | 13 | 13 | 0 | 20.7 |
| Concentration of titanium oxide in ink [%] | | 3 | 3 | 3 | 3 | 3 | 3 | 4 | 3 | 3 | 3 | 9 | 1 |
| pH | | 8.5 | 8.3 | 8.4 | 8.5 | 8.3 | 8.1 | 8.2 | 8.4 | 8.6 | 8.3 | 8.5 | 8.7 |
| Ti % (XPS: atomic %) | | 0 | 4 | 0 | 2 | 0 | 0 | 7 | 9 | 29 | 20 | 1 | 0 |

TABLE 3-continued

|  | Examples | | | | | | Comparative Examples | | | | Examples | |
| --- | --- | --- | --- | --- | --- | --- | --- | --- | --- | --- | --- | --- |
|  | B1 | B2 | B3 | B4 | B5 | B6 | B1 | B2 | B3 | B4 | B7 | B8 |
| Hiding power (color difference ΔE) [%] | 6 | 20 | 18 | 17 | 9 | 14 | 61 | 49 | 72 | 68 | 7 | 14 |
| Bending resistance of printed material [mm] | 0 | 2 | 1 | 3 | 2 | 1 | 19 | 15 | 20 | 18 | 7 | 0 |

TABLE 4

|  |  | Examples | | | | | | | | Comparative Example |
| --- | --- | --- | --- | --- | --- | --- | --- | --- | --- | --- |
|  |  | B9 | B10 | B11 | B12 | B13 | B14 | B15 | B16 | B5 |
| Kind of water-based ink |  | B13 | B14 | B15 | B16 | B17 | B18 | B19 | B20 | B21 |
| Composition formulated (g) |  |  |  |  |  |  |  |  |  |  |
| Kind of white fine particle dispersion | A1 |  |  |  |  |  | 10 | 10 | 10 |  |
|  | A5 | 10 |  |  |  |  |  |  |  |  |
|  | A6 |  | 10 |  |  |  |  |  |  |  |
|  | A7 |  |  | 10 |  |  |  |  |  |  |
|  | A8 |  |  |  | 10 |  |  |  |  |  |
|  | A9 |  |  |  |  | 10 |  |  |  |  |
|  | A12 |  |  |  |  |  |  |  |  | 10 |
| Organic solvent | Propylene glycol | 12 | 12 | 12 | 12 | 12 |  | 1.2 | 22.7 | 12 |
|  | Ethylene glycol |  |  |  |  |  | 12 |  |  |  |
| Surfactant | "SURFYNOL 104PG50" | 0.6 | 0.6 | 0.6 | 0.6 | 0.6 | 0.6 | 0.6 | 0.6 | 0.6 |
|  | "EMULGEN 120" | 0.6 | 0.6 | 0.6 | 0.6 | 0.6 | 0.6 | 0.6 | 0.6 | 0.6 |
| Ion-exchanged water |  | 13 | 13 | 13 | 13 | 13 | 13 | 23.8 | 2.3 | 13 |
| Concentration of titanium oxide in ink [%] |  | 3 | 3 | 4 | 2 | 3 | 3 | 3 | 3 | 3 |
| pH |  | 8.5 | 8.5 | 8.2 | 8.4 | 8.1 | 8.4 | 8.3 | 8.1 | 8.5 |
| Ti % (XPS: atomic %) |  | 1 | 0 | 3 | 0 | 0 | 0 | 0 | 0 | 18 |
| Hiding power (color difference ΔE) [%] |  | 34 | 15 | 19 | 17 | 10 | 7 | 9 | 6 | 52 |
| Bending resistance of printed material [mm] |  | 0 | 6 | 5 | 2 | 3 | 2 | 6 | 4 | 17 |

From Tables 3 and 4, it was confirmed that the water-based inks obtained in Examples B1 to B16 were excellent in hiding power and bending resistance and capable of satisfying both of these properties at a high level, as compared to the water-based inks obtained in Comparative Examples B1 to B5.

Synthesis Example 2-1

Synthesis of Polymer Dispersant A

A 100 mL four-necked round bottom flask equipped with a thermometer, a 100 mL nitrogen bypass-fitted dropping funnel and a refluxing device was charged with an initially charged monomer solution containing 0.5 g of n-hexyl acrylate, 0.5 g of n-butyl acrylate, 2 g of acrylic acid, 2 g of methyl ethyl ketone (as a solvent), 0.03 g of 2,2'-azobisisobutyronitrile "AIBN" as a polymerization initiator available from Wako Pure Chemical Industries, Ltd., and 0.1 g of a 15%-conc. 2-mercaptoethanol aqueous solution as a chain transfer agent available from TOYOBO Co., Ltd., and the contents of the flask were mixed with each other using a magnetic stirrer. The resulting mixture was bubbled with nitrogen for 10 minutes and then heated to 77° C. in a water bath, followed by stirring the mixture for 30 minutes.

Thereafter, the dropping funnel was charged with a dropping solution containing 4.5 g of n-hexyl acrylate, 4.5 g of n-butyl acrylate, 18.1 g of acrylic acid, 18 g of methyl ethyl ketone (as a solvent), 0.27 g of the aforementioned polymerization initiator "AIBN" and 1.15 g of the aforementioned chain transfer agent, and then the whole amount of the dropping solution was added dropwise into the flask over 3 hours. After that, the contents of the flask were maintained at 77° C. for 3 hours to complete the reaction therebetween. Then, the resulting reaction solution was charged into 1 L of n-hexane to subject the solution to reprecipitation. The resulting reprecipitated product was then dried at 70° C. under 8 kPa for 8 hours, thereby obtaining a polymer dispersant A having a number-average molecular weight of 1700 (yield: 99%).

The resulting polymer dispersant was neutralized with sodium hydroxide until a neutralization degree of the polymer reached 30 mol %. When observing a water dispersion containing 2% by mass of the thus neutralized polymer dispersant under ordinary light, Tyndall phenomenon was recognized therein. Therefore, it was confirmed that the polymer dispersant was in the form of a water-insoluble polymer.

Example C1

(1) Production of Titanium Oxide Dispersion 1

A 200 mL glass beaker was charged with 52 g of ion-exchanged water, 1.0 g of the polymer dispersant A obtained in Synthesis Example 2-1, 0.11 g of sodium hydroxide (corresponding to such an amount that a neutralization degree of the polymer became 30 mol %) and 10 g of the raw material titanium oxide JR as shown in Table 1 (mass ratio of the titanium oxide to the polymer dispersant [titanium oxide/polymer dispersant]=91/9), and the contents of the glass beaker were dispersed for 20 minutes using an ultrasonic disperser "US-3001" available from NISSEI Corporation while stirring with a magnetic stirrer. Thereafter, the resulting dispersion was mixed and dispersed at 20° C. for 8 hours using a beads mill-type disperser "Ultra Apex Mill Model No. UAM-05" available from Kotobuki Industries Co., Ltd., filled with zirconia beads having a particle size of 50 μm as media particles. Then, the resulting mixture was allowed to pass through a 200-mesh wire mesh to remove the zirconia beads therefrom, thereby obtaining a titanium oxide dispersion 1 (solid content: 30% by mass). The results are shown in Table 5.

(2) Production of White Fine Particle Dispersion C1 by Seed Polymerization

A 100 mL two-necked eggplant-shaped flask equipped with a three-way cock and a septum seal was charged with 60 g of the titanium oxide dispersion 1 obtained in the above (1) and 0.03 g of a water-soluble azo polymerization initiator "V-501" (tradename; 4,4'-azobis(4-carbovaleric acid)) available from Wako Pure Chemical Industries, Ltd., and the contents of the flask were bubbled with nitrogen for 10 minutes. Next, a 20 mL Hamilton gastight syringe was charged with a mixture of 4.2 g of butyl acrylate (BA) and 9.8 g of methyl methacrylate (MMA) (mass ratio of the polymerizable monomer to the polymer dispersant [polymerizable monomer/polymer dispersant]=14), and mounted to a micro syringe pump "MSP-3D" available from AS One Corporation. The aforementioned eggplant-shaped flask was dipped in a water bath at 72° C., and the BA/MMA mixture in the syringe was added dropwise at a dropping velocity of 0.1 mL/h·g $TiO_2$ into the reaction solution in the flask. After completion of the dropwise addition, the contents of the flask were reacted at 72° C. for 2 hours, thereby obtaining a white fine particle dispersion C1 (mass ratio of the titanium oxide to the polymer component [titanium oxide/polymer component]=43/57).

(3) Preparation of Ink

A glass container was charged with 10 g of the white fine particle dispersion C1 obtained in the above (2) and 13 g of ion-exchanged water, and the contents of the glass container were stirred with a magnetic stirrer for 10 minutes. Next, while continuously stirring the contents of the glass container with the magnetic stirrer, 12 g of propylene glycol, 0.6 g of "SURFYNOL 104PG50" (acetylene-based nonionic surfactant; propylene glycol solution; active ingredient content: 50%) available from Nissin Chemical Co., Ltd., and 0.6 g of "EMULGEN 120" (nonionic surfactant; polyoxyethylene lauryl ether) available from Kao Corporation were charged into the glass container, and the contents of the glass container were further stirred for 1 hour using the magnetic stirrer. Thereafter, the obtained dispersion was subjected to filtration treatment through a 5 gm-mesh disposable membrane filter "Minisart" available from Sartorius Inc., thereby obtaining a water-based ink C1.

The resulting ink was used to conduct solid image printing on a PET film by the below-mentioned method to prepare a printed material, and the resulting printed material was evaluated for properties thereof by the following methods. The results are shown in Table 5.

Examples C2 to C4, C13, C14 and C15 and Comparative Example C1

The same procedure as in Example C1 was repeated except that the raw material titanium oxide used in Example C1 was replaced with the respective titanium oxides as shown in Table 1.

Meanwhile, as the raw material titanium oxide, a mixture containing JR and JR405 at a mass ratio (JR/JR405) of 91/9 was used in Example C4, and a mixture containing JR and JR405 at a mass ratio (JR/JR405) of 88/12 was used in Example C15.

Example C16

The same procedure as in Example C1 was repeated except for using 10 g of the white fine particle dispersion C1, 0.5 g of the raw material titanium oxide JR and 13 g of ion-exchanged water upon production of the ink in Example C1(3): Preparation of Ink.

Examples C5 and C6

The same procedure as in Example C1 was repeated except that the amount of the polymer dispersant A used upon production of the titanium oxide dispersion in Example C1(1) was changed to 2.82 g (Example C5) and 0.10 g (Example C6), respectively, to thereby vary the mass ratio of the titanium oxide to the polymer dispersant [titanium oxide/polymer dispersant].

Examples C7 and C8

The same procedure as in Example C1 was repeated except that the dropping velocity of the BA/MMA mixture used in Example C1(2) was changed to those shown in Table 5.

Examples C9 to C11

The same procedure as in Example C1 was repeated except that the kinds of monomers used upon production of the encapsulated product in Example C1(2) were changed to a mixture of 20 g of butyl acrylate (BA) and 47 g of methyl methacrylate (MMA) (Example C9), a mixture of 0.66 g of BA and 1.53 g of MMA (Example C10) and 14 g of styrene (Example C11), respectively, to thereby vary the mass ratio of the titanium oxide to the polymer component [titanium oxide/polymer component].

Example C12

The same procedure as in Example C1 was repeated except that the polymerization initiator was changed to 2,2'-azobisisobutyronitrile "AIBN" as a non-water-soluble polymerization initiator available from Wako Pure Chemical Industries, Ltd.

The details of the titanium oxides used in the respective Examples, etc., (as shown in Table 5) are as follows.

JR: Rutile-type untreated titanium oxide; average primary particle size: 270 nm; available from TAYCA Corporation MT-600B: Rutile-type untreated titanium oxide; average primary particle size: 50 nm; available from TAYCA Corporation KR-310: Rutile-type untreated titanium oxide; average primary particle size: 400 nm; available from Titan Kogyo, Ltd.

JR-405: Rutile-type Al-treated titanium oxide; average primary particle size: 210 nm; available from TAYCA Corporation CR-80: Rutile-type Al/Si-treated titanium oxide; average primary particle size: 250 nm; available from Ishihara Sangyo Kaisha, Ltd.

TR-92: Rutile-type Al/Zr-treated titanium oxide; average primary particle size: 280 nm; available from Huntsmann Corporation <Evaluation of Printed Material>

(1) The hiding power and bending resistance of the printed material were evaluated by the same methods as described above.

(2) Evaluation of Fixing Properties of Ink on Printed Material Using PET Film:

The respective water-based inks prepared above were loaded into an ink-jet printer "IPSiO GX5000" available from Ricoh Company, Ltd., from an ink injection port located on an upper portion of a print head of the printer through a silicone tube. Using a software "Photoshop (registered trademark)" available from Adobe Systems Inc., solid image printing was conducted on a PET film "LUMIRROR T60" (thickness: 75 μm; water absorption: 2.3 g/m$^2$) available from Toray Industries Inc., under such a condition that an amount of the ink ejected was 14 g/m$^2$, to thereby prepare a solid image print pattern (size: 204 mm in width× 275 mm in length) thereon. The solid image pattern-printed film was dried at an ambient temperature of 23° C. under a relative humidity of 50% for 60 minutes, thereby obtaining a printed material.

A cellulose nonwoven fabric "BEMCOT M3-II" available from Asahi Kasei Fiber K.K., was placed on the resulting printed material, and the surface of the printed material was rubbed with the cellulose nonwoven fabric by 10 reciprocating motions while applying a load of 2 kg thereto. The image density value of the surface of the "BEMCOT" was measured before and after the rubbing using a reflection densitometer "RD-915" available from GretagMacbeth AG.

The difference between the image density values before and after the rubbing was calculated to evaluate fixing properties of the ink from the calculated difference value. The lower the calculated difference value, the more excellent the fixing properties of the ink.

(3) Measurement of Viscosity of Ink

The viscosity (mPa·s) of the ink was measured at 32° C. using an E-type viscometer "Model No.: TV-25" (equipped with a standard cone rotor 1°34'×R24; rotating speed: 50 rpm) available from Toki Sangyo Co., Ltd.

(4) Evaluation of Deinking Properties

Using "SX75" available from Suga Test Instruments Co., Ltd., the printed material obtained in the above (2) was exposed to light having an irradiation intensity of 180 W/m$^2$ under the environmental conditions including a black panel temperature of 60° C. and a relative humidity of 50% (xenon lamp; light having a wavelength of 275 to 400 nm) for 1 hour. Thereafter, a cellulose nonwoven fabric "BEMCOT M3-II" available from Asahi Kasei Fiber K.K., was placed on the printed material, and the surface of the printed material was rubbed with the cellulose nonwoven fabric by 5 reciprocating motions while applying a load of 1 kg thereto. The image density value of the surface of the "BEMCOT" was measured before and after the rubbing using a reflection densitometer "RD-915" available from GretagMacbeth AG.

The difference between the image density values before and after the rubbing was calculated to evaluate deinking properties of the ink from the calculated difference value. The larger the calculated difference value, the more excellent the deinking properties of the ink.

TABLE 5

| | Raw material titanium oxide | | | | Step 1 | | Step 2 |
|---|---|---|---|---|---|---|---|
| | Kind | Surface treatment | Surface titanium atomic fraction (atomic %) [20°]*1 | Average primary particle size (nm) | Kind of polymer dispersant | TiO$_2$/polymer dispersant (mass ratio) | Monomer dropping velocity (mL/h · gTiO$_2$) |
| Example C1 | JR | None | 33 | 270 | A | 91/9 | 0.1 |
| Example C2 | MT-600B | None | 33 | 50 | A | 91/9 | 0.1 |
| Example C3 | KR-310 | None | 33 | 400 | A | 91/9 | 0.1 |
| Example C4 | JR/JR-405 = 91/9 | ** | 31 | 260 | A | 91/9 | 0.1 |
| Example C5 | JR | None | 33 | 270 | A | 78/22 | 0.1 |
| Example C6 | JR | None | 33 | 270 | A | 99/1 | 0.1 |
| Example C7 | JR | None | 33 | 270 | A | 91/9 | 0.9 |
| Example C8 | JR | None | 33 | 270 | A | 91/9 | 1.2 |
| Example C9 | JR | None | 33 | 270 | A | 91/9 | 0.1 |
| Example C10 | JR | None | 33 | 270 | A | 91/9 | 0.1 |
| Example C11 | JR | None | 33 | 270 | A | 91/9 | 0.1 |
| Example C12 | JR | None | 33 | 270 | A | 91/9 | 0.1 |
| Example C13 | JR-405 | Al | 13 | 210 | A | 91/9 | 0.1 |
| Example C14 | CR-80 | Al, Si | 8 | 250 | A | 91/9 | 0.1 |
| Comparative Example C1 | TR-92 | Al, Zr | 7 | 280 | A | 91/9 | 0.1 |
| Example C15 | JR/JR-405 = 88/12 | ** | 28 | 260 | A | 91/9 | 0.1 |
| Example C16 | JR | None | 33 | 270 | A | 91/9 | 0.1 |

| | White fine particles | | | | | |
|---|---|---|---|---|---|---|
| | Surface titanium atomic fraction (atomic %) [20°]*1 | Surface titanium atomic fraction (atomic %) [45°]*2 | Precipitated/ non-precipitated in centrifugal separation (mass ratio) | TiO$_2$/polymer component | D$_{50}$ (nm) | Coating rate of formula (1) (%) |
| Example C1 | 0.0 | 0.0 | 99/1 | 39/61 | 390 | 100 |
| Example C2 | 0.7 | 2.1 | 98/2 | 39/61 | 80 | 98 |
| Example C3 | 0.1 | 4.7 | 94/6 | 39/61 | 510 | 100 |
| Example C4 | 0.4 | 0.4 | 92/8 | 39/61 | 370 | 99 |

TABLE 5-continued

| | | | | | | |
|---|---|---|---|---|---|---|
| Example C5 | 1.5 | 1.7 | 90/10 | 36/64 | 370 | 95 |
| Example C6 | 1.7 | 2.1 | 97/3 | 40/60 | 390 | 95 |
| Example C7 | 1.2 | 1.2 | 91/9 | 39/61 | 420 | 96 |
| Example C8 | 1.8 | 2.0 | 88/12 | 39/61 | 375 | 95 |
| Example C9 | 0.0 | 0.1 | 90/10 | 12/88 | 440 | 100 |
| Example C10 | 1.9 | 2.0 | 97/3 | 74/26 | 350 | 94 |
| Example C11 | 0.3 | 0.5 | 95/5 | 39/61 | 385 | 99 |
| Example C12 | 1.9 | 2.1 | 90/10 | 39/61 | 410 | 94 |
| Example C13 | 0.7 | 0.8 | 82/18 | 39/61 | 290 | 95 |
| Example C14 | 0.9 | 1.4 | 77/23 | 39/61 | 350 | 89 |
| Comparative Example C1 | 4.1 | 8.8 | 66/34 | 39/61 | 390 | 41 |
| Example C15 | 0.3 | 0.4 | 88/12 | 39/61 | 370 | 99 |
| Example C16 | 2.2 | 2.8 | 99/1 | 40/60 | 395 | 93 |

| | Evaluation results | | | | |
|---|---|---|---|---|---|
| | Hiding power ($\Delta E$) (%) | Bending resistance (mm) | Fixing properties on PET film | Viscosity of ink (mPa·s) | Deinking properties |
| Example C1 | 11 | 3 | 0.02 | 4.0 | 1.00 |
| Example C2 | 42 | 0 | 0.02 | 5.4 | 0.99 |
| Example C3 | 17 | 7 | 0.11 | 4.4 | 0.96 |
| Example C4 | 6 | 2 | 0.21 | 5.2 | 0.92 |
| Example C5 | 13 | 3 | 0.04 | 6.1 | 0.89 |
| Example C6 | 12 | 2 | 0.07 | 5.9 | 0.92 |
| Example C7 | 14 | 4 | 0.06 | 5.2 | 0.97 |
| Example C8 | 17 | 7 | 0.08 | 5.8 | 0.90 |
| Example C9 | 11 | 4 | 0.02 | 5.4 | 0.93 |
| Example C10 | 14 | 5 | 0.12 | 4.2 | 0.99 |
| Example C11 | 11 | 4 | 0.10 | 4.3 | 0.98 |
| Example C12 | 13 | 2 | 0.09 | 5.6 | 0.92 |
| Example C13 | 6 | 1 | 0.52 | 5.5 | 0.31 |
| Example C14 | 19 | 2 | 0.59 | 6.8 | 0.25 |
| Comparative Example C1 | 55 | 19 | 0.68 | 8.4 | 0.11 |
| Example C15 | 7 | 4 | 0.32 | 5.4 | 0.86 |
| Example C16 | 18 | 4 | 0.30 | 5.6 | 0.88 |

Note:
*1Measured at a photoelectron takeoff angle of 20° by XPS;
** Al-treated product was mixed.
Note:
*1Measured at a photoelectron takeoff angle of 20° by XPS;
*2Measured at a photoelectron takeoff angle of 45° by XPS.

From Table 5, it was confirmed that the water-based inks obtained in Examples C1 to C16 were excellent in hiding power and bending resistance and capable of satisfying both of these properties at a high level, and were also capable of satisfying not only excellent fixing properties even when printed on a resin film, but also suppression of increase in viscosity of the ink and good deinking properties at a high level.

INDUSTRIAL APPLICABILITY

In accordance with the present invention, it is possible to provide white fine particles from which a white ink that is capable of satisfying high hiding power and good bending resistance in a printed material can be obtained; white fine particles from which an ink that is capable of satisfying not only excellent fixing properties even when printed on a non-liquid absorbing printing medium such as a resin film, but also suppression of increase in viscosity of the ink and at the same time good deinking properties at a high level can be obtained; a water-based ink containing the white fine particles; and a process for producing a dispersion of the white fine particles. The white fine particles, the water-based ink and the production process are useful, in particular, for ink-jet printing.

The invention claimed is:

1. White fine particles comprising titanium oxide and a polymer component with which the titanium oxide is encapsulated, in which a titanium atomic fraction of a surface of the respective white fine particles as measured at a photoelectron takeoff angle of 45° by X-ray photoelectron spectroscopy (XPS) is not more than 7 atomic %, wherein a mass ratio of the titanium oxide to the polymer component [titanium oxide/polymer component] is not less than 10/90 and not more than 70/30, the polymer component comprises a polymer comprising a constitutional unit derived from at least one polymerizable monomer selected from the group consisting of a (meth) acrylate and an aromatic group-containing monomer, in addition to an underlying polymer dispersant comprising a constitutional unit derived from at least one compound selected from the group consisting of (meth)acrylic acid and an alkyl (meth)acrylate, the polymer dispersant is a vinyl polymer that is produced by copolymerizing a monomer mixture comprising (a) a salt-forming group-containing monomer and (b) a hydrophobic monomer, and the content of the constitutional unit derived from (a) the salt-forming group-containing monomer in the whole constitutional units of the polymer dispersant is not less than 30% by mass and not more than 85% by mass.

2. The white fine particles according to claim 1, wherein the white fine particles comprise the titanium oxide and the polymer component with which the titanium oxide is encapsulated, in which a titanium atomic fraction of a surface of respective particles of the titanium oxide as measured at a photoelectron takeoff angle of 20° by X-ray photoelectron spectroscopy (XPS) is not less than 30 atomic %, and a titanium atomic fraction of a surface of the respective white fine particles as measured at a photoelectron takeoff angle of 20° by X-ray photoelectron spectroscopy (XPS) is not more than 2 atomic %.

3. The white fine particles according to claim 1, wherein a mass ratio of precipitated particles (precipitated component) to non-precipitated particles (non-precipitated component) [precipitated component/non-precipitated component] as measured by subjecting the white fine particles to centrifugal separation under the following conditions is from 100/0 to 95/5:

Conditions of centrifugal separation:

A water dispersion of the white fine particles having a solid content of 20% by mass is subjected to centrifugal separation using a centrifuge in a 25° C. atmosphere at a relative centrifugal acceleration of 170 G for 1 hour.

4. The white fine particles according to claim 1, wherein the titanium oxide is untreated, or surface-treated with at least one material selected from the group consisting of alumina, silica, zinc oxide and zirconia.

5. The white fine particles according to claim 1, wherein the titanium oxide is titanium oxide whose surface is subjected to no surface treatment.

6. The white fine particles according to claim 1, wherein an average primary particle size of the titanium oxide is not less than 30 nm and not more than 500 nm.

7. The white fine particles according to claim 1, wherein a volume median particle size ($D_{50}$) of the white fine particles is not less than 50 nm and not more than 680 nm.

8. The white fine particles according to claim 1, wherein the polymer component comprises a constitutional unit derived from a (meth)acrylic monomer.

9. The white fine particles according to claim 1, wherein the polymer dispersant is in the form of a water-insoluble polymer.

10. The white fine particles according to claim 1, a polymer coating rate represented by the formula (1) is not less than 93% and not more than 100%:

Polymer coating rate (%)={1−(titanium atomic fraction of surface of respective white fine particles)/(titanium atomic fraction of surface of titanium oxide)}×100 (1).

11. A water-based ink comprising the white fine particles according to claim 1, in which the titanium atomic fraction of the surface of the respective white fine particles as measured at a photoelectron takeoff angle of 45° by X-ray photoelectron spectroscopy (XPS) is not more than 5 atomic %.

12. The water-based ink according to claim 11 for use in ink-jet printing.

13. A process for producing a dispersion of white fine particles formed by encapsulating titanium oxide with a polymer component, comprising the following steps 1 and 2:

Step 1: mixing the titanium oxide and a polymer dispersant to obtain a titanium oxide dispersion; and Step 2: adding a polymerizable monomer to the titanium oxide dispersion obtained in the step 1 to subject the polymerizable monomer to polymerization reaction, thereby obtaining the dispersion of the white fine particles, in which a titanium atomic fraction of a surface of the respective white fine particles as measured at a photoelectron takeoff angle of 45° by X-ray photoelectron spectroscopy (XPS) is not more than 7 atomic %, and the titanium oxide is untreated, or surface-treated with at least one material selected from the group consisting of alumina, silica, zinc oxide and zirconia.

14. The process for producing a dispersion of white fine particles according to claim 13, wherein a mass ratio of the titanium oxide to the polymer dispersant [titanium oxide/polymer dispersant] in the step 1 is not less than 75/25 and not more than 99/1.

15. The process for producing a dispersion of white fine particles according to claim 13, wherein the polymerizable monomer used in the step 2 is at least one monomer selected from the group consisting of a (meth)acrylate monomer and an aromatic group-containing monomer.

16. The process for producing a dispersion of white fine particles according to claim 13, wherein subjecting a titanium oxide mixture comprising the titanium oxide, the polymer dispersant and an aqueous medium to dispersing treatment in the step 1.

* * * * *